US011972272B2

(12) United States Patent
Berg et al.

(10) Patent No.: US 11,972,272 B2
(45) Date of Patent: *Apr. 30, 2024

(54) GENERATION OF BOTS BASED ON OBSERVED BEHAVIOR

(71) Applicant: SAP SE, Walldorf (DE)

(72) Inventors: Gregor Berg, Berlin (DE); Andre Niklas Wenz, Berlin (DE); Bernhard Hoeppner, Berlin (DE); Thomas Bodner, Berlin (DE); Olga Cherepanova, Malschenberg (DE); Lasse Steffen, Berlin (DE); Jan Siebert, Potsdam (DE); David Hennemann, Dortmund (DE); Pascal Schulze, Berlin (DE); Konstantin Dobler, Potsdam (DE); Kris-Fillip Kahl, Velten (DE); Paul Udo Beneke, Loitz (DE); Philipp Bernhard Hoberg, Potsdam (DE)

(73) Assignee: SAP SE, Walldorf (DE)

( * ) Notice: Subject to any disclaimer, the term of this patent is extended or adjusted under 35 U.S.C. 154(b) by 130 days.

This patent is subject to a terminal disclaimer.

(21) Appl. No.: 17/196,720

(22) Filed: Mar. 9, 2021

(65) Prior Publication Data

US 2021/0216339 A1 Jul. 15, 2021

Related U.S. Application Data

(63) Continuation of application No. 16/447,033, filed on Jun. 20, 2019, now Pat. No. 10,977,058.

(51) Int. Cl.
*G06F 9/451* (2018.01)
*G06F 3/0482* (2013.01)
(Continued)

(52) U.S. Cl.
CPC ............ *G06F 9/451* (2018.02); *G06F 3/0482* (2013.01); *G06F 9/45512* (2013.01); *G06V 30/153* (2022.01); *G06V 30/10* (2022.01)

(58) Field of Classification Search
CPC .......... G06N 20/00; G06N 3/006; G06N 5/04; G06N 5/022; G06N 5/045; H04L 51/02;
(Continued)

(56) References Cited

U.S. PATENT DOCUMENTS

| 7,162,458 B1 | 1/2007 | Flanagan et al. |
| 7,616,960 B2 | 11/2009 | Anke et al. |

(Continued)

FOREIGN PATENT DOCUMENTS

| BR | 102015010583 A2 * | 12/2015 | ............. G05B 13/04 |
| CA | 2736750 A1 * | 3/2010 | ......... A63B 24/0021 |

(Continued)

OTHER PUBLICATIONS

"U.S. Appl. No. 16/293,399, Notice of Allowance mailed Jun. 12, 2020", 8 pgs.

(Continued)

*Primary Examiner* — Steven P Sax

(74) *Attorney, Agent, or Firm* — SCHWEGMAN LUNDBERG & WOESSNER, P.A.

(57) ABSTRACT

An application server provides an application to client devices. Users of the client devices interact with the application to perform a business process. Data regarding user interactions with the application is transmitted from the client devices to the application server. Based on an analysis of the received data, a bot generation server generates a bot to automate a process step. The bot generation server provides a heatmap user interface (UI) that provides information regarding the process steps. Using the heatmap UI, the administrator selects a process step for automation. In
(Continued)

response to the selection, the hot generation server identifies, based on the observed behavior, relationships between input fields, typical values for input fields, typical order of data entry into input fields, or any suitable combination thereof. Based on the identified patterns, the hot generation server generates a bot to automate some or all of the process step.

20 Claims, 22 Drawing Sheets

(51) Int. Cl.
  *G06F 9/455* (2018.01)
  *G06V 30/148* (2022.01)
  *G06V 30/10* (2022.01)

(58) Field of Classification Search
  CPC ......... H04L 51/32; H04L 67/22; H04L 41/16; H04L 2463/144; H04L 51/04; H04L 51/36; H04L 9/3213; G06F 8/30; G06F 11/3003; G06F 40/35; G06F 9/45512; G06F 9/451; G06F 3/04812; G06F 3/0482; G06F 3/0484; G06Q 10/10; G06Q 10/103; G06Q 30/0201; G05B 19/41885; G05B 19/418; H04H 60/33; G06K 9/344; G06K 2209/01; G06V 30/153
  See application file for complete search history.

(56) References Cited

U.S. PATENT DOCUMENTS

| | | | |
|---|---|---|---|
| 7,694,307 B2 | 4/2010 | Kraiss et al. | |
| 7,861,260 B2 | 12/2010 | Shkedi | |
| 8,150,871 B2 | 4/2012 | Klensch et al. | |
| 8,407,081 B1 | 3/2013 | Rajasenan | |
| 8,583,678 B2 | 11/2013 | Vainer et al. | |
| 9,082,107 B2 | 7/2015 | Cheung et al. | |
| 9,164,990 B2 | 10/2015 | Vainer et al. | |
| 9,171,851 B2 | 10/2015 | Matichuk et al. | |
| 9,213,954 B2 | 12/2015 | Khalatov et al. | |
| 9,218,189 B2 | 12/2015 | Vainer et al. | |
| 9,245,245 B2 | 1/2016 | Sherman et al. | |
| 9,786,075 B2 | 10/2017 | Aguera-arcas | |
| 9,800,727 B1 | 10/2017 | Chakrabarty et al. | |
| 9,871,752 B2* | 1/2018 | Bartkiewicz | G06F 3/048 |
| 10,360,193 B2 | 7/2019 | Sarkar et al. | |
| 10,558,686 B2 | 2/2020 | Drushku | |
| 10,768,977 B1* | 9/2020 | Paul | H04L 63/101 |
| 10,812,627 B2 | 10/2020 | Berg et al. | |
| 10,977,058 B2* | 4/2021 | Berg | G06V 30/153 |
| 11,204,787 B2* | 12/2021 | Radebaugh | G10L 15/26 |
| 11,295,228 B2* | 4/2022 | Hosabettu | G06N 20/00 |
| 11,374,945 B1* | 6/2022 | Senecal | H04L 63/1466 |
| 11,436,526 B1* | 9/2022 | Ganesan | G05B 19/048 |
| 2002/0129342 A1 | 9/2002 | Kil et al. | |
| 2003/0182413 A1 | 9/2003 | Allen et al. | |
| 2005/0080637 A1 | 4/2005 | Gruia et al. | |
| 2005/0102292 A1 | 5/2005 | Tamayo | |
| 2005/0171833 A1 | 8/2005 | Jost et al. | |
| 2006/0184410 A1 | 8/2006 | Ramamurthy et al. | |
| 2006/0212359 A1 | 9/2006 | Hudgeon | |
| 2008/0120129 A1 | 5/2008 | Seubert et al. | |
| 2009/0007127 A1 | 1/2009 | Roberts et al. | |
| 2009/0043637 A1 | 2/2009 | Eder | |
| 2014/0172625 A1* | 6/2014 | Reisman | G06Q 30/0282 705/26.7 |
| 2014/0278746 A1 | 9/2014 | Kolowich et al. | |
| 2015/0170107 A1 | 6/2015 | Itani et al. | |
| 2015/0213392 A1 | 7/2015 | Kittur et al. | |
| 2015/0363481 A1* | 12/2015 | Haynes | G06Q 10/10 707/748 |
| 2016/0191554 A1* | 6/2016 | Kaminsky | H04L 63/1425 726/23 |
| 2017/0228119 A1 | 8/2017 | Hosbettu et al. | |
| 2018/0011930 A1 | 1/2018 | Azaria et al. | |
| 2018/0032997 A1 | 2/2018 | Gordon et al. | |
| 2018/0103047 A1* | 4/2018 | Turgeman | G06Q 20/4014 |
| 2018/0212904 A1* | 7/2018 | Smullen | H04L 51/04 |
| 2018/0365597 A1 | 12/2018 | Farrell et al. | |
| 2019/0015974 A1* | 1/2019 | Mummigatti | G06F 16/951 |
| 2019/0155894 A1 | 5/2019 | Gandhi et al. | |
| 2019/0171513 A1 | 6/2019 | Purushothaman | |
| 2019/0303807 A1* | 10/2019 | Gueye | G06F 16/9537 |
| 2019/0311279 A1 | 10/2019 | Sinha et al. | |
| 2020/0005248 A1 | 1/2020 | Gerzi et al. | |
| 2020/0287992 A1 | 9/2020 | Berg et al. | |
| 2020/0364083 A1* | 11/2020 | Walby | G06Q 10/0631 |
| 2020/0401430 A1 | 12/2020 | Berg et al. | |
| 2021/0158268 A1 | 5/2021 | Berg et al. | |

FOREIGN PATENT DOCUMENTS

| | | | | |
|---|---|---|---|---|
| CA | 2504680 C | * | 4/2014 | ............. G06F 21/10 |
| CA | 3003617 A1 | * | 11/2018 | ............ G06F 40/174 |
| CA | 3036265 A1 | * | 11/2018 | ............ G06F 40/174 |
| CN | 110008023 A | * | 7/2019 | ......... G06F 9/45558 |
| JP | 4228387 B2 | * | 2/2009 | |
| SG | 10202000787P A | * | 3/2020 | |
| WO | WO-2009139869 A1 | * | 11/2009 | ............. G06F 21/10 |

OTHER PUBLICATIONS

"U.S. Appl. No. 16/293,399, Notice of Allowance mailed Jul. 21, 2020", 8 pgs.
"U.S. Appl. No. 16/447,033, Examiner Interview Summary mailed Oct. 8, 2020", 3 pgs.
"U.S. Appl. No. 16/447,033, Non Final Office Action mailed Jun. 8, 2020", 29 pgs.
"U.S. Appl. No. 16/447,033, Notice of Allowance mailed Jan. 7, 2021", 17 pgs.
"U.S. Appl. No. 16/447,033, Response filed Aug. 5, 2020 to Non Final Office Action mailed Jun. 8, 2020", 11 pgs.
"U.S. Appl. No. 16/447,033, Supplemental Amendment filed Oct. 7, 2020".
"SAP Process Mining by Celonis 4.0—Manual", Celonis GmbH, (2016), 108 pgs.
Saylam, Rabia, et al., "Process Mining in Business Process Management: Concepts and Challenges", IEEE, (2012), 131-134.
Van der Aalst, Wil, et al., "Process Mining Put into Context", IEEE Internet Computing, vol. 16, No. 1, (2012), 82-86.
Van der Aalst, Wil, et al., "Process Mining: Discovering and Improving Spaghetti and Lasagna Processes", IEEE Symposium on Computational Intelligence and Data Mining, (2011), 1-7.
U.S. Appl. No. 16/293,399 U.S. Pat. No. 10,812,627, filed Mar. 5, 2019, Frontend Process Mining.
U.S. Appl. No. 16/447,033 U.S. Pat. No. 10,977,058, filed Jun. 20, 2019, Generation of Bots Based on Observed Behavior.
U.S. Appl. No. 16/698,757, filed Nov. 27, 2019, Process Improvement Based on User Behavior Mining.
"U.S. Appl. No. 16/698,757, Reply Brief filed Sep. 26, 2022 in Response to Examiner's Answer mailed Aug. 5, 2022 37", 9 pgs.
"U.S. Appl. No. 16/698,757, Appeal Brief filed Apr. 22, 2022", 26 pgs.
"U.S. Appl. No. 16/698,757, Examiner Interview Summary mailed Aug. 18, 2021", 2 pgs.
"U.S. Appl. No. 16/698,757, Examiner's Answer mailed Aug. 5, 2022", 12 pgs.
"U.S. Appl. No. 16/698,757, Final Office Action mailed Nov. 24, 2021", 23 pgs.
"U.S. Appl. No. 16/698,757, Non Final Office Action mailed Jun. 10, 2021", 18 pgs.
"U.S. Appl. No. 16/698,757, Response filed Sep. 9, 2021 to Non Final Office Action mailed Jun. 10, 2021", 14 pgs.
White, Ryen W., et al., "Task Duration Estimation", Microsoft Research, In the Twelfth ACM International Conference on Web Search and Data Mining (WSDM '19), (Feb. 11, 2019), 9 pgs.

(56) References Cited

OTHER PUBLICATIONS

"U.S. Appl. No. 16/698,757, Appeal Decision mailed Feb. 23, 2024", 28 pgs.

* cited by examiner

MINED DATA TABLE — 510

| OBJECT ID | CLIENT ID | USER ID | EVENT TYPE ID | DURATION | CLICKSTREAM |
|---|---|---|---|---|---|
| 1 | 101 | 1001 | 1 | 30 | |
| 1 | 102 | 1002 | 2 | 1440 | |
| 1 | 101 | 1003 | 3 | 90 | |
| 2 | 103 | 1001 | 4 | 17 | |

BUSINESS OBJECT TABLE — 540

| OBJECT ID | OBJECT TYPE |
|---|---|
| 1 | INVOICE |
| 2 | CUSTOMER |

EVENT TYPE TABLE — 570

| EVENT TYPE ID | EVENT DESCRIPTION |
|---|---|
| 1 | CREATE INVOICE |
| 2 | CHANGE BASELINE DATE |
| 3 | PAY INVOICE |
| 4 | CHANGE ADDRESS |

| PROCESS TYPE TABLE (610) ||
|---|---|
| OBJECT TYPE (620) | PROCESS TYPE |
| INVOICE (630A) | ACCOUNTS RECEIVABLE |
| CUSTOMER (630B) | CUSTOMER MANAGEMENT |

| USER TABLE (640) ||
|---|---|
| USER ID (650) | USER NAME |
| 1001 (660A) | COLLYER, BUD |
| 1002 (660B) | REEVES, GEORGE |
| 1003 (660C) | REEVE, CHRISTOPHER |

*FIG. 6*

CREATE SALES DOCUMENT — 805

| ORDER TYPE: | CBM0 | MTO STANDARD ORDER |

ORGANIZATIONAL DATA — 825

| SALES ORGANIZATION | 1710 | DOM. SALES ORG US |
| DISTRIBUTION CHANNEL | 10 | DIRECT SALES |
| DIVISION | 00 | PRODUCT DIVISION 00 |
| SALES OFFICE | | |
| SALES GROUP | | |

CREATE WITH REFERENCE — 895

*FIG. 8*

```
┌─────────────────────────────────────────────────────────┐
│                                              ┌─┬□┬X┐   │
│              CREATE MTO STANDARD ORDER ─ 905            │
│         ┌─910    ┌─915                                  │
│         │QUOTATION:│ 20000004 │                         │
│                                                         │
│                                                         │
│    ┌─920     ┌─925        ┌─930      ┌─935    ┌─940    │
│    │MTO STANDARD ORDER│CBM0│  │NET VALUE:│353.50│USD│   │
│                                                         │
│       ┌─945       ┌─950     ┌─955                       │
│       │SOLD-TO PARTY:│1710005│DOM. US CUSTOMER 5 (CMS)/1000│
│       │              │       │2ND AVE N / BILLINGS MT 59101-2614│
│                                                         │
│       ┌─960       ┌─965     ┌─970                       │
│       │SHIP-TO PARTY:│1710005│DOM. US CUSTOMER 5 (CMS)/1000│
│       │              │       │2ND AVE N / BILLINGS MT 59101-2614│
│                                                         │
│       ┌─975       ┌─980                                 │
│       │CUST. REFERENCE:│CR1709011│                      │
│                                                         │
│       ┌─985       ┌─990                                 │
│       │REQ. DELIV. DATE│12/21/2017│                     │
│                                                         │
└─────────────────────────────────────────────────────────┘
```

ORDER PROCESS ANALYSIS — 1010

| | USER INTERFACE /1020 | TIME% /1030 | REWORK% /1040 |
|---|---|---|---|
| 1050A | MANAGE SALES ORDERS | 20% | 2% |
| 1050B | CREATE SALES ORDER | 30% | 16% |
| 1050C | CREATE MTO STANDARD ORDER | 28% | 7% |
| 1050D | CREATE MTS STANDARD ORDER | 12% | 4% |
| 1050E | CLOSE INVOICE | 10% | 1% |

*FIG. 10*

| | MAX | MEAN | MEDIAN | MIN | N | PERC5 | PERC50 | PERC95 | STD |
|---|---|---|---|---|---|---|---|---|---|
| CLICKS | 14 | 12.09 | 13 | 6 | 11 | 8.5 | 13 | 14 | 2.11 |
| DURATION | 343912 | 62180 | 30706 | 12159 | 11 | 15981.5 | 30706 | 212097 | 90970.1 |
| KEYS INPUTLENGTH | 6 | 4.36 | 6 | 0 | 11 | 0 | 6 | 6 | 2.67 |
| PASTES | 0 | 0 | 0 | 0 | 11 | 0 | 0 | 0 | 0 |
| KEYSTROKES | 1 | 0.73 | 1 | 0 | 11 | 0 | 1 | 1 | 0.45 |
| TABSWITCHES | 0 | 0 | 0 | 0 | 11 | 0 | 0 | 0 | 0 |

FIG. 14

| TYPE | EVENT | TIME |
|---|---|---|
| ⇅ | USER LEAVES APP TO HTTPS://HELP.SAP.COM/... | 5/3/19 11:40:56 GMT |
| ⬆ | USER CLICKS ON *BUTTON* WITH LABEL CREATE SUPPLIER INVOICE | 5/3/19 11:40:42 GMT |
| ⬆ | USER CLICKS ON *BUTTON* WITH LABEL UNKNOWN | 5/3/19 11:40:40 GMT |
| ▦ | USER CHANGES FIELD WITH LABEL INVOICING PARTY TO VALUE 1018 (4 STROKES, 0 DELETES) | 5/3/19 11:40:40 GMT |
| ⬆ | USER CLICKS ON *INPUT* WITH LABEL INVOICING PARTY | 5/3/19 11:40:36 GMT |
| ⬆ | USER CLICKS ON *SMARTFIELD* WITH LABEL INVOICING PARTY | 5/3/19 11:40:36 GMT |

*FIG. 15*

GENERATION OF BOTS BASED ON OBSERVED BEHAVIOR

CROSS-REFERENCE TO RELATED APPLICATIONS

This application is a continuation of prior application Ser. No. 16/447,033, filed on Jun. 20, 2019, which is incorporated by reference herein in its entirety.

TECHNICAL FIELD

The subject matter disclosed herein generally relates to robotic process automation (RPA). Specifically, the present disclosure addresses systems and methods to automatically generate process automation bots based on observed behavior related to frontend processes.

BACKGROUND

Using current RPA techniques, experts manually build RPA bots that interact with a user interface (UI) in the same manner that a user would. The bots perform routine software interaction tasks such as entering data in forms or looking up data. The design process typically involves experts discussing the process with users to determine which process to automate and how the automation will be most effective for users. Determining whether the automation was successful is determined either by the human experts or by tools that rely on backend data.

BRIEF DESCRIPTION OF THE DRAWINGS

Some embodiments are illustrated by way of example and not limitation in the figures of the accompanying drawings.

FIGS. 5-6 are block diagrams of a database schema, according to some example embodiments, suitable for use in generating hots based on observed behavior.

FIG. 8 is a diagram of a UI in a process suitable for automation using hots, according to some example embodiments.

FIG. 9 is a diagram of a UI in a process suitable for automation using hots, according to some example embodiments.

FIG. 10 is a diagram of a UI for displaying results of frontend process mining, according to some example embodiments.

FIG. 14 is a data table showing statistics for a task based on observed behavior, according to some example embodiments, FIG. 15 is a diagram of a UI for displaying raw events, according to some example embodiments.

DETAILED DESCRIPTION

Figure 1:
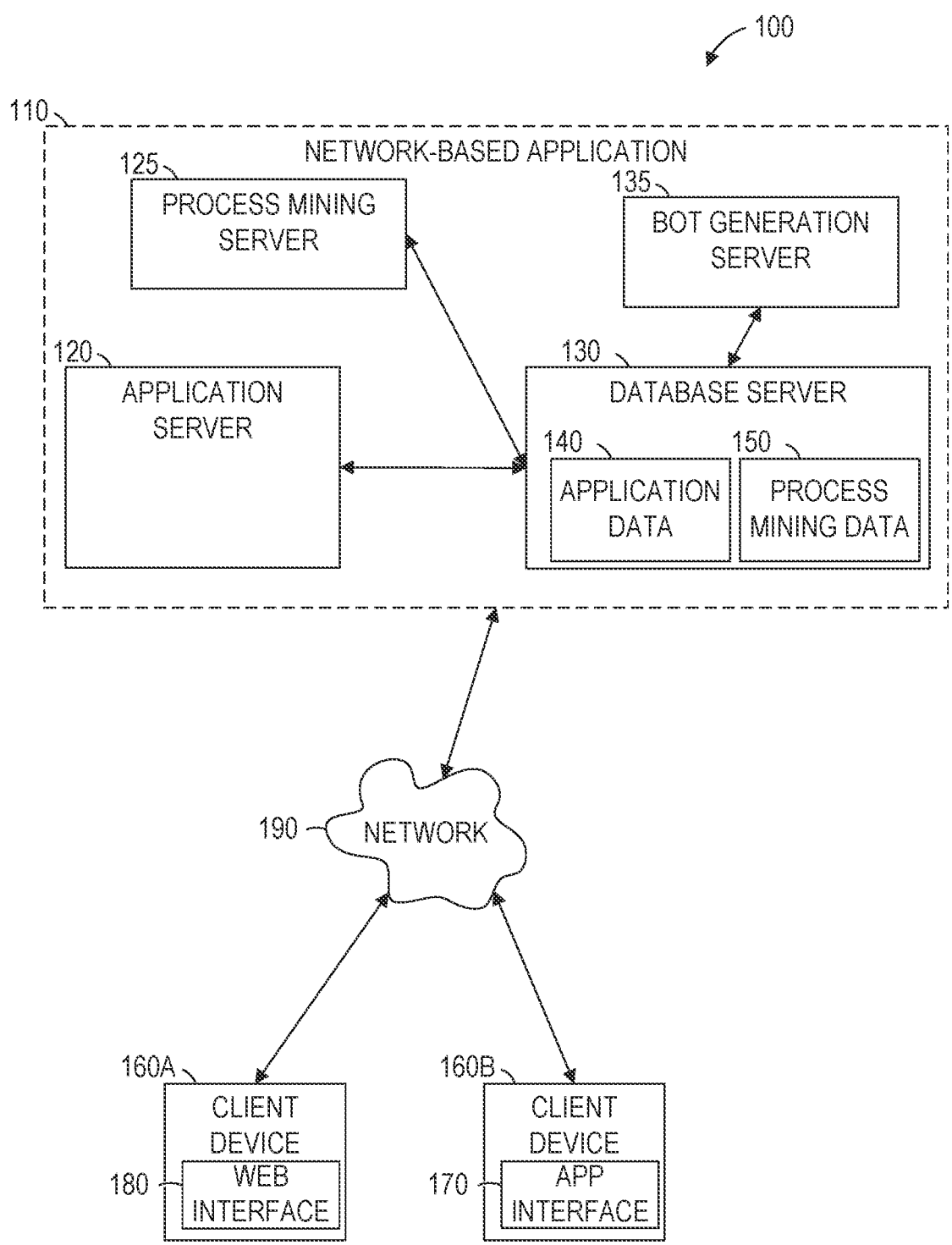
FIG. 1 is a network diagram illustrating a network environment suitable for generating bots based on Observed behavior, according to some example embodiments.

Example methods and systems are directed to generating bots based on observed behavior. An application server provides an application or set of applications to one or more client devices. One or more users of the client devices interact with the applications to perform a business process. For example, in an accounts receivable process, a first user uses a first UI to enter data for a customer who can pay invoices; a second user uses a second UI to generate an invoice to be paid by the customer; and a third user uses a third UI to enter data for a received payment.

A business process comprises one or more operations that create, modify, or delete a business object. A business object is an object (in the Object-Oriented Programming sense of the word) or data structure that represents a business entity. A business entity is any person, place, thing, document, or service that relates to a business. Example business entities include employees, customers, companies, sales orders, invoices, products, and services. A business object has a lifecycle in which the business object is created, used, and destroyed. For example, a business object for an employee is created when the employee is hired, maintained and modified during the employee's term of employment, and may be deleted or archived when the relationship with the employee is severed. A business process may correlate to a part of (or the entirety of) the lifecycle of a business object. By way of example, the methods and systems described herein operate on business processes and business objects, but the invention is not so limited.

One or more of the client devices stores data that tracks user interactions with the application. In some example embodiments, the time, location and UI element of each mouseclick and keypress are stored. The data is transmitted from the client devices to the application server for analysis. Data from multiple client devices is correlated to enable analysis of a complex business process. As a result of the analysis, bottlenecks may be identified based on a particular LA taking a long time to complete or receiving repeated re-entry of data. The solution is automated and scalable, allowing for analysis of an entire business process landscape.

Each time a user opens an application, the application identifies a type of business object being worked on to identify the business process. For example, if the user is working on a specific invoice with identifier 12314, the UI of the application will include the string "Invoice 12314" somewhere. Thus, each UI can be analyzed to determine if the word "Invoice" followed by a number is present and the business object identified accordingly. As another example, if the user is working on a specific customer with identifier 54321, the UI of the application will include the string "Customer 54321" somewhere. Thus, the frontend process mining system can determine both if the business object being worked on is a Customer or an Invoice as well as the specific business object being worked on. The step of the business process is identified based on the name of the application and the changes performed by the user. The completion of the process step is determined based on specific UI elements interacted with by the user (e.g., a "submit" or "save" button).

In response to completion of a process step or at a predetermined time (e.g., once per hour), the client device sends the frontend process mining data to the bot generation server for analysis. Based on an analysis of the frontend process mining data, the hot generation server generates a hot to automate a process step. For example, the bot generation server may provide a heatmap UI that allows an administrator to determine which process step is experiencing a high rate of data re-entry (e.g., a rate that exceeds a predetermined threshold).

Using the heatmap the administrator selects the process step for automation. In response to the selection, the bot generation server identifies, based on the observed behavior gathered through frontend process mining, relationships between input fields, typical values for input fields, typical order of entry of data into input fields, or any suitable combination thereof. Based on the identified patterns, the bot generation server generates a bot to automate some or all of the process step.

By comparison with existing methods of generating bots, the methods and systems discussed herein reduce the level of effort expended in the automation process and reduce the level of effort in using the resulting bot. The automation process is streamlined because the bot generation server generates the bot instead of the bot being created by a user. The resulting bot requires less effort to use because the bot is generated based on actual observed behavior aggregated from multiple users. As a result, the hot is optimized for the actual workflow. By contrast, an expert uses human judgment to determine the best workflow based on limited observations. As a result, the expert's bot may be most efficient at handling a use case that is not actually the most common use case and may be unable to handle any use cases not considered by the expert.

When these effects are considered in aggregate, one or more of the methodologies described herein may obviate a need for certain efforts or resources that otherwise would be involved in using a UI, either manually or using a hot. Computing resources used by one or more machines, databases, or networks may similarly be reduced. Examples of such computing resources include processor cycles, network traffic, memory usage, data storage capacity, power consumption, and cooling capacity.

FIG. 1 is a network diagram illustrating a network environment 100 suitable for generating bots based on observed behavior, according to some example embodiments. The network environment 100 includes a network-based application 110, client devices 160A and 160B, and a network 190. The network-based application 110 is provided by an application server 120 in communication with a database server 130, storing application data 140 and process mining data 150. The processes provided by the application server 120 are monitored by the process mining server, also in communication with the database server 130. The application server 120 accesses the application data 140 to provide an application to the client devices 160A and 160B via a web interface 180 or an application interface 170. A hot generation server 135, which may be considered a part of the network-based application 110 or a separate system, accesses the process mining data 150 to generate bots based on observed behavior. The application server 120, a process mining server 125, the database server 130, the bot generation server 135, and the client devices 160A and 160B may each be implemented in a computer system, in whole or in part, as described below with respect to FIG. 22. The client devices 160A and 160B may be referred to collectively as client devices 160 or generically as a client device 160.

The process mining server 125 receives data from the client devices 160 regarding user interactions with the application. The received data is provided to the database server 130 for storage as the process mining data 150. The process mining data 150 is analyzed by the process mining server 125 to identify problems in a business process being performed using the application. In response to identifying a problem in a business process, the bot generation server 135 generates a bot to automate a portion of the business process.

Any of the machines, databases, or devices shown in FIG. 1 may be implemented in a general-purpose computer modified (e.g., configured or programmed) by software to be a special-purpose computer to perform the functions described herein for that machine, database, or device. For example, a computer system able to implement any one or more of the methodologies described herein is discussed below with respect to FIG. 22. As used herein, a "database" is a data storage resource and may store data structured as a text file, a table, a spreadsheet, a relational database (e.g., an object-relational database), a triple store, a hierarchical data store, a document-oriented NoSQT: database, a file store, or any suitable combination thereof. The database may be an in-memory database. Moreover, any two or more of the machines, databases, or devices illustrated in FIG. 1 may be combined into a single machine, database, or device, and the functions described herein for any single machine, database, or device may be subdivided among multiple machines, databases, or devices.

The application server 120, the process mining server 125, the database server 130, the bot generation server 135, and the client devices 160A-160B are connected by the network 190. The network 190 may be any network that enables communication between or among machines, databases, and devices. Accordingly, the network 190 may be a wired network, a wireless network (e.g., a mobile or cellular network), or any suitable combination thereof. The network 190 may include one or more portions that constitute a private network, a public network (e.g., the Internet), or any suitable combination thereof.

Figure 2:
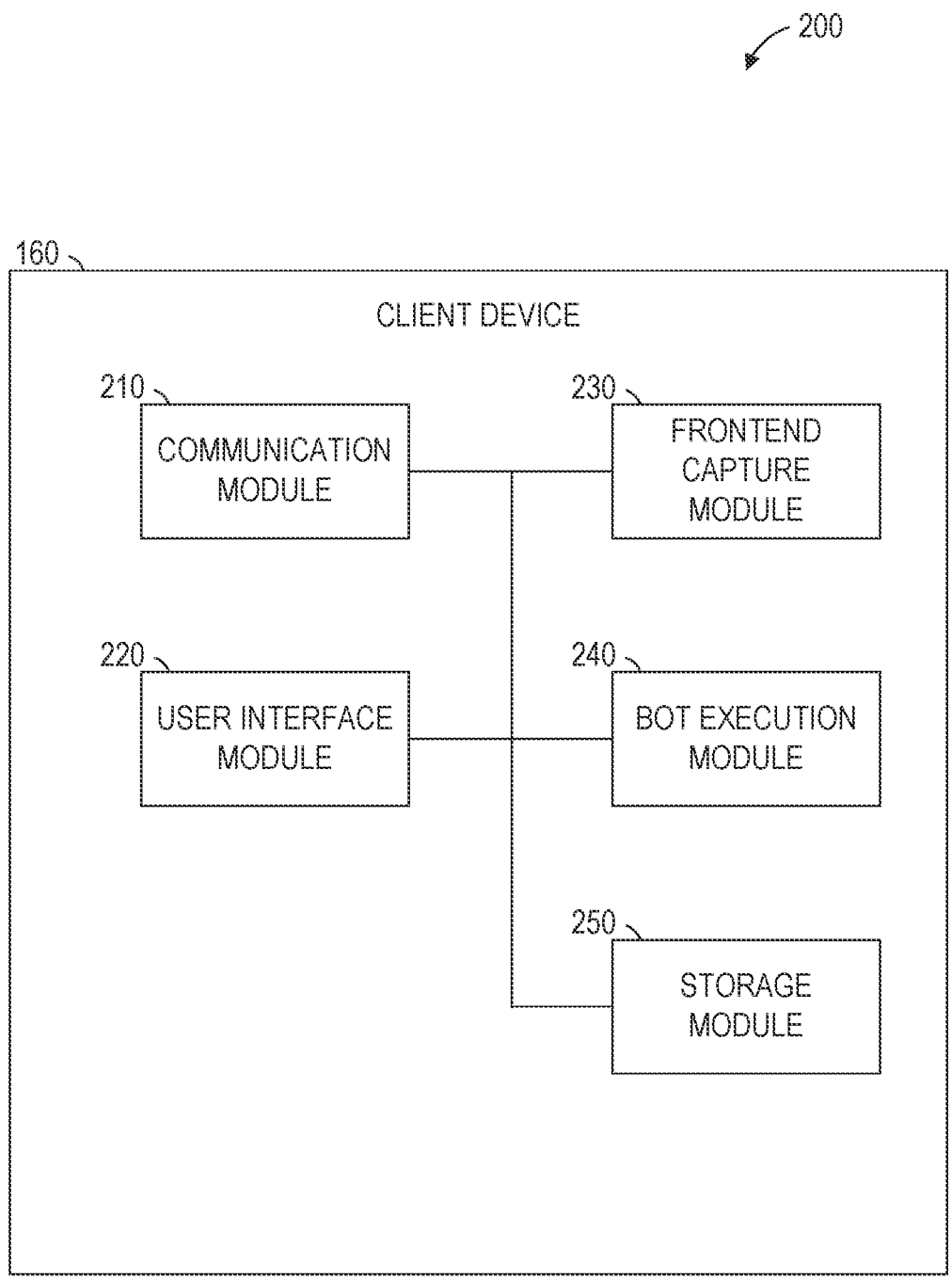
FIG. 2 is a block diagram of a client device, according to some example embodiments, suitable for observing behavior and running hots.

FIG. 2 is a block diagram 200 of a client device, according to some example embodiments, suitable for observing behavior and running bots. The client device 160 is shown as including a communication module 210, a UI module 220, a frontend capture module 230, a bot execution module 240, and a storage module 250, all configured to communicate with each other (e.g., via a bus, shared memory, or a switch). Any one or more of the modules described herein may be implemented using hardware (e.g., a processor of a machine). For example, any module described herein may be implemented by a processor configured to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

The communication module 210 receives data sent to the client device 160 and transmits data from the client device 160. For example, the communication module 210 receives, from the application server 120, data (e.g., a hypertext markup language (HTML) file) for a selected application. As another example, the communication module 210 receives, from the bot generation server 135, a bot for automation of a portion of a business process. The communication module 210 provides the data to the UI module 220. The UI module 220 causes a UI for the application to be displayed on a display device integrated into or connected to the client device 160. The UI module 220 may receive from the application server 120 instructions (e.g., an executable or interpreted file or data) that, when executed by the client device 160, cause the client device 160 to perform operations. The operations include displaying a UI for performing a task of a business process, storing a timestamp for each user interaction with the UI, and transmitting the user interaction data to the application server 120.

The frontend capture module 230 gathers data regarding user interactions with the UI and stores the gathered data on a storage device of the client device 160 via the storage module 250. In response to a request from the application server 120, the frontend capture module 230 retrieves the stored data and transmits the stored data to the application server 120 via the communication module 210. In alternative embodiments, the process mining data is sent to the application server periodically (e.g., once per minute or once per hour) or in response to a particular interaction with the UI (e.g., detecting that a button was pressed that indicates that data entry is complete).

In some example embodiments, the frontend capture module 230 is implemented as a JavaScript client that periodically transmits JavaScript object notation (JSON)-formatted data to the application server 120. In other example embodiments, the frontend capture module 230 is implemented as a browser (e.g., Chrome or Firefox) plugin or extension. In still other example embodiments, the frontend capture module 230 captures data from Fieri applications running on S/4HANA®. User-identifying data may be stripped from the process mining data by the frontend capture module 230 before the data is transmitted to the application server 120.

The process mining data comprises metadata, clickstreams, or both. Metadata includes information that identifies the process, the process instance, and the observed user activities (e.g., which UI buttons were pressed, which checkboxes were selected, what the final text in a text field was). Clickstreams include information about the mouse movements and key presses and their sequence and timings that generated the observed user activities.

Privacy may be protected using domain whitelisting. A list of domains is accessed by the frontend capture module 230 and process mining data is gathered only when the web browser is presenting a web page from a whitelisted domain. If the user switches to an unlisted domain, the data collection pauses.

Additionally or alternatively, privacy may be protected by obfuscating or removing user-identifying information by the client-side process before transmitting the information to the process mining server 125. Content entered into data fields may be hashed by the frontend capture module 230 prior to transmission. The hashing of the data fields protects the user- or company-identifying or confidential information but still allows the bot generation server 135 to determine when the same value is being entered across multiple process instances because the hashes will be the same. This enables the determination of which tasks have high repeatability, even if the automated bot generation process cannot identify the common value. Furthermore, even when the data values are obfuscated, aggregated information such as the total number of clicks, total number of characters entered, number of paste actions, number of character deletions, how often the focus was switched away, location in the DONI hierarchy of each click and character entry, and total time spent are reported. This enables the determination of which tasks are unusually time-consuming and thus are good choices for automation.

The bot execution module 240 executes bots received from the bot generation server 135. A UI bot interacts with a UI provided by the application server 120 by simulating the actions of a user. In various example embodiments, the UI bot controls the mouse cursor, selects input fields, enters text data, selects values from drop down lists, submits forms, or any suitable combination thereof. The bot may be executed using JavaScript run by a browser plug-in, as a program in a separate running environment, or any suitable combination thereof.

Figure 3:
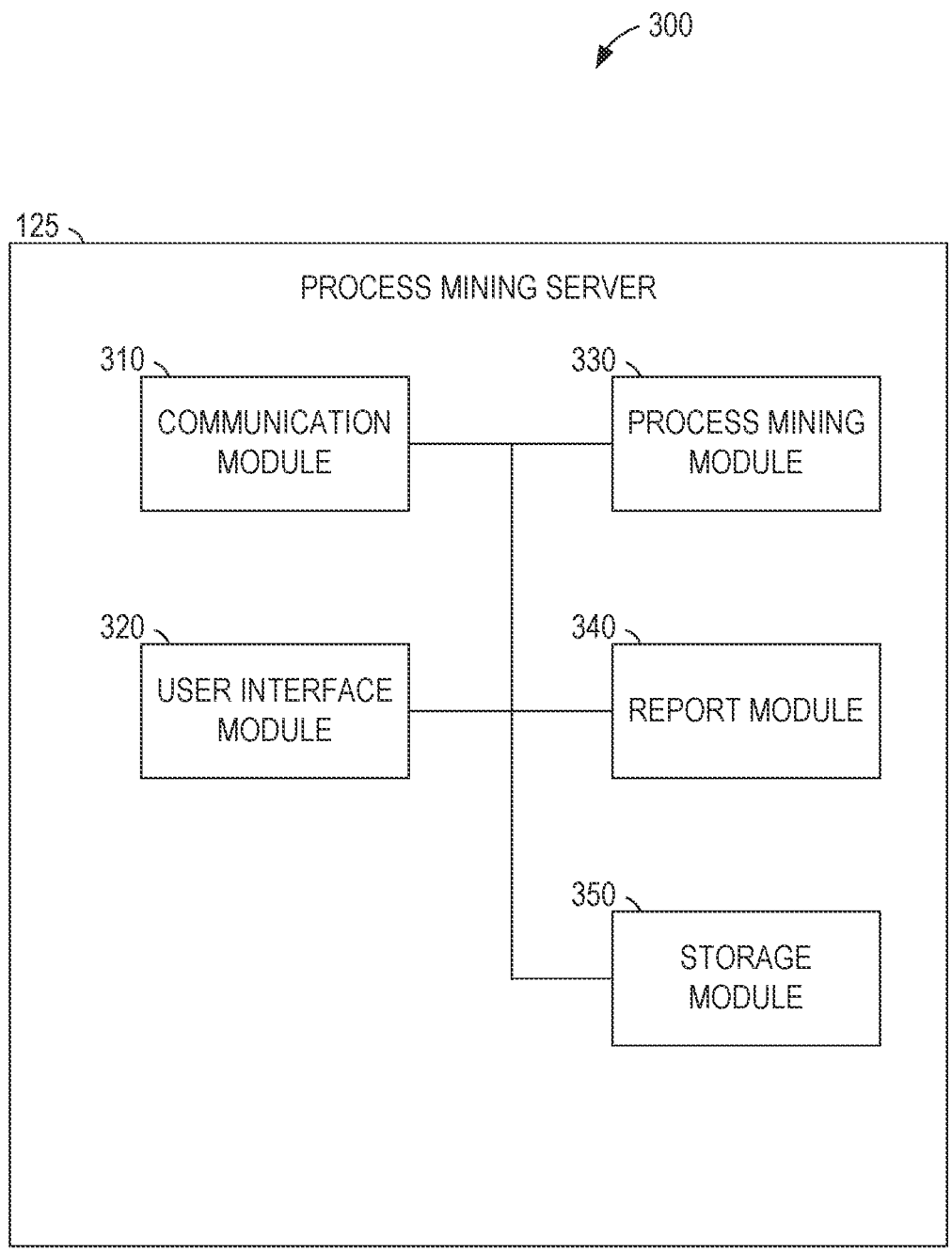
FIG. 3 is a block diagram of a process mining server, according to some example embodiments, suitable for frontend process mining.

FIG. 3 is a block diagram 300 of the process mining server 125, according to some example embodiments, suitable for frontend process mining. The process mining server 120 is shown as including a communication module 310, a UI module 320, a process mining module 330, a report module 340, and a storage module 350, all configured to communicate with each other (e.g., via a bus, shared, memory, or a switch). Any one or more of the modules described herein may be implemented using hardware (e.g., a processor of a machine). For example, any module described herein may be implemented by a processor configured to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

The communication module 310 receives data sent to the process mining server 120 and transmits data from the process mining server 120. For example, the communication module 310 may receive, from the client device 160, frontend process mining data. The communication module 310 provides the frontend process mining data to the process mining module 330, stores submitted data in the database of the database server 130 via the storage module 350, or any suitable combination thereof.

The process mining module 330 receives frontend process mining data from the client device 160 (e.g., the process mining module 330 may request the frontend process mining data, the client device 160 may push the frontend process mining data, or both). In some example embodiments, the frontend process mining data is received via the communication module 310 and stored in a database via the storage module 350. After being stored, the data may be accessed from the database. Communications sent and received by the communication module 210 may be intermediated by the network 190.

The UI module 320 causes presentation of a UI for the process mining server 125 on a display (e.g., a display associated with an administrator of the process or a display of a device of another user interested in understanding and optimizing processes). The UI allows a user to select a process or a process instance from a list of processes or process instances, to view process mining data for the selected process or process instances, to modify a process, to select a process or task of the process for generating a bot based on observed behavior, or any suitable combination thereof. The UI ray be presented using process Innovation Explorer (PEE).

Figure 4:
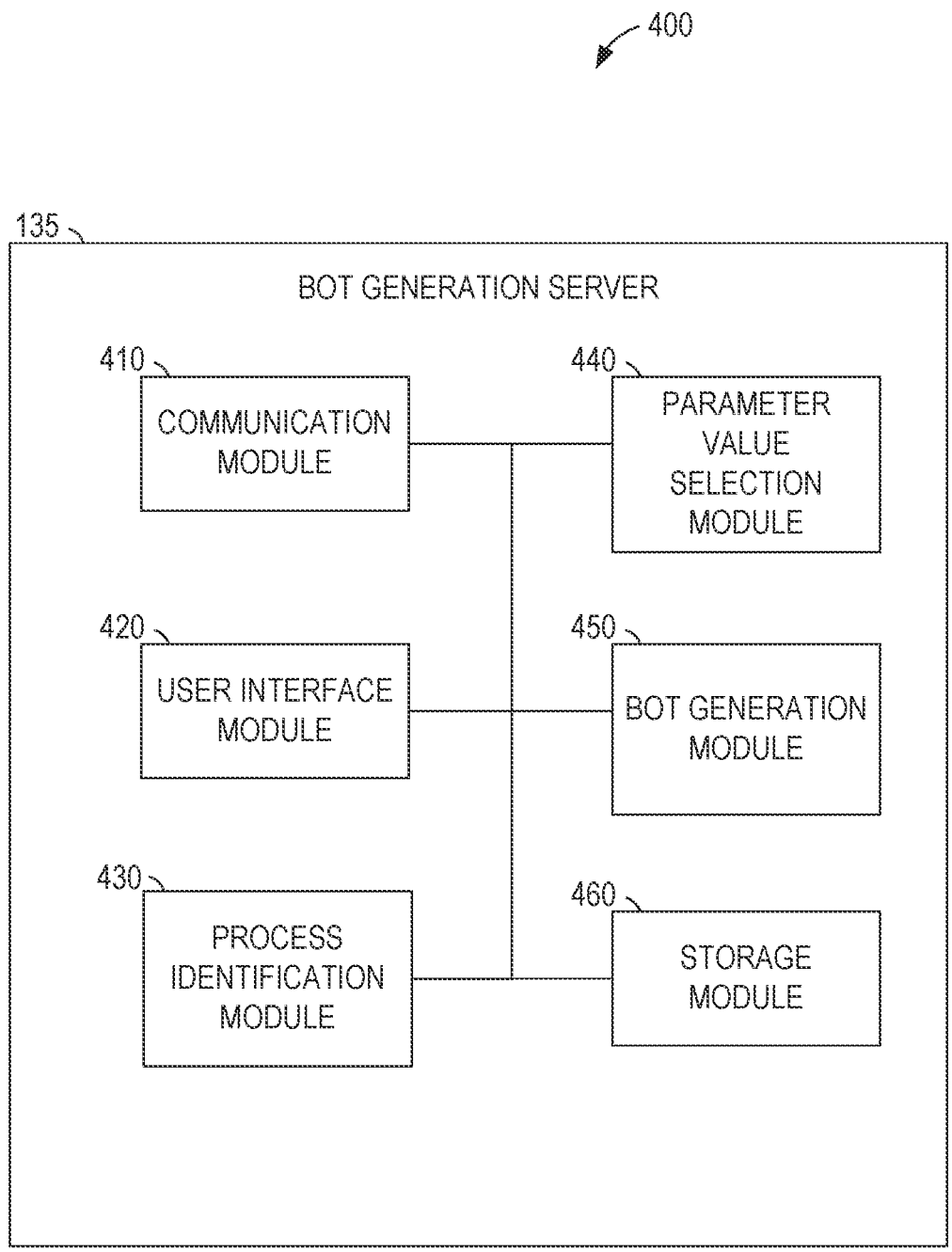
FIG. 4 is a block diagram of a hot generation server, according to some example embodiments, suitable for generating hots based on observed behavior.

The report module 340 generates a report based on process mining data analyzed by the process mining module 330. For example, multiple users on different client devices 160 each interact with different Us while working on a single business process (e.g., an accounts receivable process). Bata gathered during each interaction is stored by the process mining module 330 as the process mining data 150 of the database server 130. The gathered data is analyzed by the process mining module 330 and a UI is identified that has a substantially higher than average number of interactions with a particular data entry field. As an example, identification of such a UI is performed by comparing weekly averages of how long each process step takes and determining that an anomaly is present when a process step varies from the average by 20% or more. In response to the detection of this anomaly, the process mining module 330 causes the report module 340 to generate a report (e.g., in an email or text message) and to send the report to an administrative account, causes the bot generation server to generate a bot to automate the process step, or any suitable combination thereof, FIG. 4 is a block diagram 400 of the bot generation server 135, according to some example embodiments, suitable for generating bots based on observed behavior. The bot generation server 135 is shown as including a communication module 410, a UI module 420, a process identification module 430, a parameter value selection module 440, a bot generation module 450, and a storage module 460, all configured to communicate with each other (e.g., via a bus, shared memory, or a switch). Any one or more of the modules described herein may be implemented using hardware (e.g., a processor of a machine). For example, any module described herein may be implemented by a processor configured to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

The communication module 410 receives data sent to the bot generation server 135 and transmits data from the hot generation server 135. For example, the communication module 410 may receive, from the database server 130, frontend process mining data. The communication module 410 provides the frontend process mining data to the process identification module 430 and the parameter value selection module 440. Communications sent and received by the communication module 410 may be intermediated by the network 190.

The process identification module 430 receives frontend process mining data from the database server 130. Based on the frontend process mining data, the process identification module 430 identifies a process or process step that would benefit from automation. The determination may be based on statistics for the process or process step and a predetermined threshold. For example, a process step with an unusually high variance in time to completion may benefit from automation and this may be detected by comparing the variance in time to completion to a predetermined threshold variance.

The IA module 420 causes presentation of a UI for the bot generation server 135 on a display associated with an administrator of the process. The UI allows a user to select a process or a process instance from a list of processes or process instances, to view process mining data for the selected process or process instance, to select a process or task of the process for generating a bot based on observed behavior, to modify or approve a generated hot, or any suitable combination thereof.

The bot generation module 450 generates bots that perform sequences of behaviors in a task, based on clickstreams. The parameter value selection module 440 determines default parameter values for a generated bot based on process mining data. For example, multiple users on different client devices 160 each interact with different UIs while working on a single business process (e.g., an accounts receivable process). The gathered data is analyzed by the process identification module 430 and a is identified that has a substantially higher than average number of interactions with a particular data entry field. As an example, identification of such a UI is performed by comparing weekly averages of how long each process step takes and determining that an anomaly is present when a process step varies from the average by 20% or more. The bot generation module 450 is invoked by a user (e.g., using the UI 1100 of FIG. 11, discussed below) or automatically. For example, in an automatic implementation, in response to the detection of this anomaly, the process identification module 430 generates a bot that uses a set of parameters to determine the selections or data entries to make in the UI.

The parameter value selection module 440 determines, based on the clickstream data, default values for the parameters. For example, if one data entry field receives the same value more than a threshold percentage of the the time (e.g., 50%), as observed in the clickstream data, that value is used as the default value for the parameter that controls data entry into that data entry field. As another example, if two data entry fields have the same value more than a threshold percentage of the time (e.g., 50%), a Boolean parameter for the bot that causes the data entry to be the same in both fields if true and allows different values if false defaults to true.

The bot generation server 135 stores generated bots using the storage module 460. The stored hots may be stored on a data storage device (e.g., hard, drive) of the bot generation server 135, on a data storage device of the database server 130, or on another data storage device. In some example embodiments, the bots are generated in a format compatible with SAP Intelligent Robotic Process Automation Studio. In other example embodiments, the bot generation server 135 provides parameters to control bot creation to SAP Intelligent Robotic Process Automation Studio and SAP Intelligent Robotic Process Automation generates the bot.

FIGS. 5-6 are block diagrams of a database schema 500, according to some example embodiments, suitable for frontend process mining. The database schema 500 includes a mined data table 510, a business object table 540, an event type table 570, a process type table 610, and a user table 640. The mined data table 510 includes rows 530A, 530B, 530C, and 530D of a format 520. The business object table 540 includes rows 560A and 560B of a format 550. The event type table 570 includes rows 590A, 590B, 590C, and 590D of a format 580. The process type table 610 includes rows 630A and 630B of a format 620. The user table 640 includes rows 660A, 660B, and 660C of a format 650.

The format 520 of the mined data table 510 includes an object identifier field, a client identifier field, a user identifier field, an event type identifier field, a duration field, and a clickstream field. Each of the rows 530A-530D stores mined data for a single event (e.g., updating data for an order). The event may consist of multiple field changes (e.g., changing a Value, Due Date, and Address of an order). The event type identifier identifies the type of the event. For example; the event type identifier may identify the UI through which the user interaction was received. The object identifier identifies the business object to which the event was applied. For example, in an invoice generation UI, the same event type identifier would be used for the data entry of the payer of the interface on multiple invoices, but the object identifier would be different for each invoice. The client identifier identifies the client device 160 that generated the event (e.g., with an Internet protocol (IP) address or other identifier). The user identifier identifies a user account associated with the event (e.g., a user account of the client device 160 that was logged in at the time the event was generated). The duration field indicates an amount of time associated with the event (e.g., a number of seconds elapsed between the providing of a UI and completion of the event (e.g., the time of receipt of the last interaction that is part of updating the data for the order)).

The clickstream field of the rows 530A-530D stores the mined frontend interaction data for the event. The clickstream field includes times and positions of mouse clicks; times, fields, and characters of text entered; times and positions of checkboxes checked; or any suitable combination thereof. An example of clickstream data is:

```
"metadata": {
    "sessionId": "string", "userId": "string", "sampleTitle": "string",
    "url": "string",
    "screenInformation": { "displaySize": { "width": "number", "height": "number"
    },
        "windowSize": { "width": "number", "height": "number" },
    },
    "chromeVersion": "string", "userAgent": "string", "currentAppName":
        "string", "additionalCustomerInformation": { }, "clickStreamId":
        "string",
    "ui5Version": "string"
},
"Click": {
    "businessObject": { "path": "string", "type": "string", "object": "any" },
    "timestamp": {"unix": "number", "date": "string"};
    "uiComponentType": "string",
    "uiComponentID": "string",
    "parentsInDomTree": [{ "id": "string", "tag": "string" }],
    "semantic": {
        "text": { "title": "string", "foundInLevel": "int" },
        "label": { "title": "string", "foundInLevel": "int" },
    },
}
```

```
"Key": {
    "keyStrokes": [{
        "timestamp": { }, "keyCode": "string", "character": "string"
    }],
    "input": "string",
    "pastedContent": [{ "timestamp": { }, "content": "string", "source":
    "string" }],
    ...
}
```

In the example above, the clickstream data is divided into three main components: "Metadata," "Click," and "Key." The "Metadata" component includes metadata that identifies the session, user, and title of the UI; the uniform resource locator (URL) of the web page comprising the UI; screen information of the client device; browser type and version; and additional information. The "Click" component includes data identifying the business object interacted with, the time of the interaction, the type of the UI component, the identifier of the UI component, the identifier of the parent component in the domain object model (DOM) tree, and the label of the UI component.

The "Key" component includes a list of keystroke data structures. Each keystroke data structure includes a timestamp and a string with the characters entered. The "input" and "pastedContent" fields further indicate whether the characters were entered using the keyboard or were pasted into the UI.

The format 550 of the business object table 540 includes an object identifier field and an object type field. Thus, the object type for a business object can be determined by looking up the object identifier in the business object table 540. By reference to the rows 560A and 560B of the business object table 540, the business object of the rows 530A-530C is an invoice object and the business object of the row 530D is a customer object.

The rows 590A, 590B, 590C, and 590D of the event type table 570 are in the format 580, including an event type identifier and an event description. Thus, the event description for an event can be determined by looking up the event type identifier in the event type table 570. By reference to the rows 590A-590C of the event type table 570, the business process for the invoice of the rows 530A-530C includes events to create an invoice, change a baseline date, and pay an invoice. By reference to the row 590D, the business process for the customer of the row 530D includes an event to change an address.

The format 620 of the process type table 610 includes an object type field and a process type field. Thus, the type of business process performed is determined by the type of business object being manipulated. As indicated by the rows 630A and 630B, an invoice business object is used in an accounts receivable process and a customer business object is used in a customer management process.

The rows 660A, 660B, and 660C of the user table 640 are in the format 650, including a user identifier and a user name. Thus, by cross-referencing the event type table 570 with the user table 640, the names of users generating events are revealed. In some example embodiments, user-identifying, information is removed to ensure that information is generated in the aggregate without embarrassing individual users.

Figure 7:
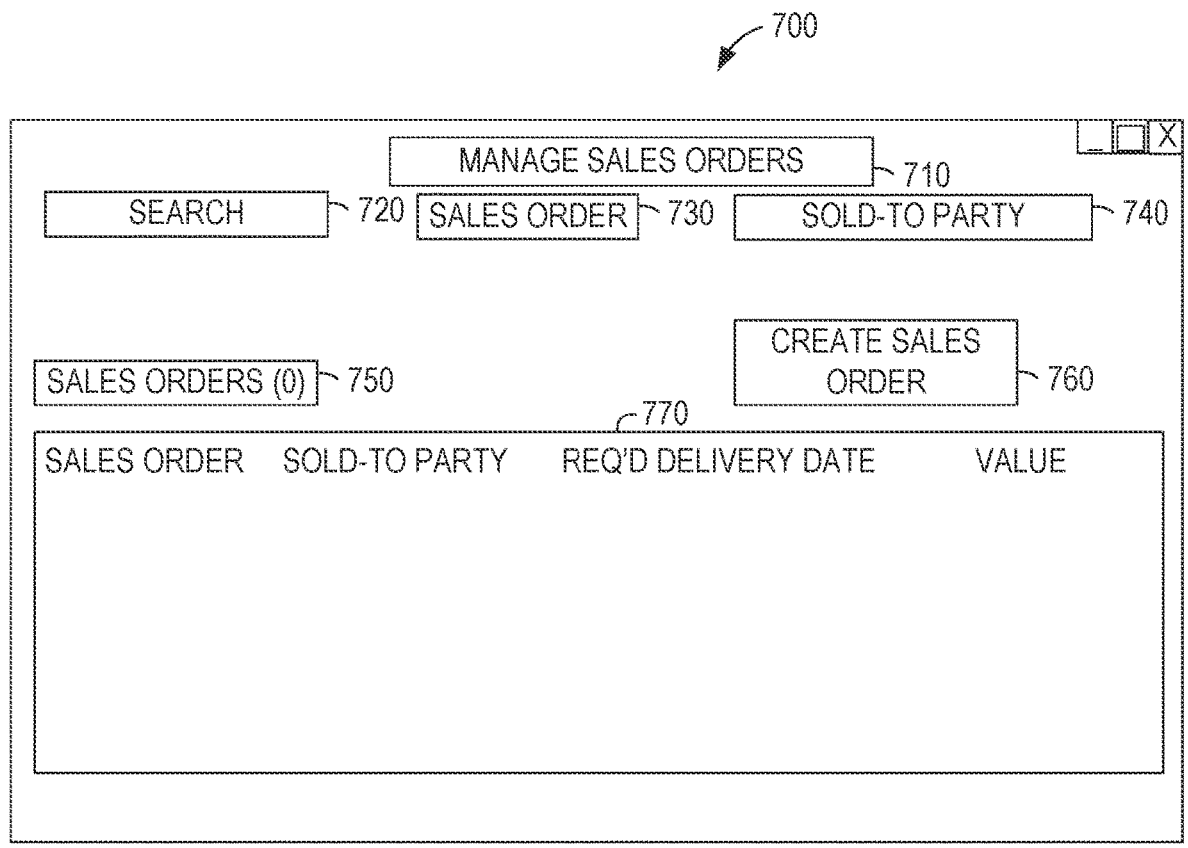
FIG. 7 is a diagram of a UI in a process suitable for automation using hots, according to some example embodiments.

FIG. 7 is a diagram of a UI 700 in a process suitable for automation using bots, according to some example embodiments. The UT 700 includes a title 710; fields 720, 730, and 740; text 750; a button 760; and an information area 770.

The title 710 indicates that the UI 700 is for managing sales orders. The fields 720-740 are operable to receive search terms for filtering sales order data presented in the information area 770. The text 750 indicates that the information area 770 contains sales order data and provides the number of sales orders included in the information area 770. The button 760 is operable to create a sales order. The information area 770 provides a sales order identifier, a name of the sold-to party, a required delivery date, and a value for each sales order responsive to the search terms. The search terms include plain-text search (in the field 720), sales order identifier search (in the field 730), and sold-to party search (in the field 740).

FIG. 8 is a diagram of a UI 800 in a process suitable for automation using bots, according to some example embodiments. The UI 800 includes a title 805; indicators 810, 830, 845, 860, 875, and 885; fields 815, 835, 850, 865, 880, and 890; descriptors 820, 840, 855, and 870; data area 825; and button 895. The title 805 indicates that the UI 800 is for creating a sales document. Thus, the UI 800 may be displayed in response to operation of the button 760 of the UI 700. The button 895 is operable to complete the sales document with reference to an already-existing quotation.

The indicator 810 indicates that the field 815 defines the order type of the sales document. The descriptor 820 provides a description of the order type indicated in the field 815. The fields 815, 835, 850, 865, 880, and 890 may be implemented as text fields, drop-down lists, combo boxes, or any suitable combination thereof.

The data area 825 contains indicators, descriptors, and fields for the order. The sales organization type (indicator 830) is 1710 (field 835), which is a domestic sales organization in the United States (descriptor 840). The distribution channel type (indicator 845) is 10 (field 850), which is a direct sales channel (descriptor 855). The division selling the items sold (indicator 860) is 00 (field 865), product division 00 (descriptor 870). The sales office (indicator 875) and sales group (indicator 885) have not yet been filled in (fields 880 and 890), and thus do not have corresponding descriptors.

FIG. 9 is a diagram of a UI 900 in a process suitable for automation using bots, according to some example embodiments. The UI 900 includes a title 905; indicators 910, 930, 945, 960, 975, and 985; fields 915, 925, 935, 940, 950, 965, 980, and 990; and descriptors 920, 955, and 970. The title 905 indicates that the UI 900 is for creating a standard order. The UI 900 may be displayed in response to operation of the button 895 of the UI 800.

The indicator 910 indicates that the field 915 defines the quotation on which the sales order is to be based. The data shown in the fields 925, 935, 940, 950, 965, 980, and 990 are populated by the application server 120 based on the quotation identified in the field 915. The fields 925, 935, 940, 950, 965, 980, and 990 may also receive user input to change the data from the quotation for the sales order.

As shown in the example UI 900, the order type (field 925) is a standard order (descriptor 920); the net value of the order (indicator 930) is 5353.50 (fields 935 and 940); the sold-to party (indicator 945) has identifier 1710005 (field 950) and is a domestic U.S. customer located on 2nd Avenue in Billings, Montana (descriptor 955); the ship-to party (indicator 960) is the same as the sold-to party (field 965) with the same description (descriptor 970); the customer reference identifier (indicator 975) is CR1709011 (field 980); and the required delivery date (indicator 985) is Dec. 21, 2017 (field 990).

FIG. 10 is a diagram of a UI 1000 suitable for presenting results of frontend process mining, according to some example embodiments. The LI 1000 includes a title 1010; headers 1020, 1030, and 1040; and result rows 1050A, 1050B, 1050C, 1050D, and 1050E. The title 1010 indicates that the UI 1000 is displaying results of analysis for an order process. The UI 1000 is generated using data gathered using frontend process mining.

The headers 1020-1040 indicate that each of the result rows 1050A-1050E includes a time percentage and a rework percentage for each UI in the order process. The time percentage indicates the percentage of the total time spent on the process that is spent in the indicated UI. Thus, the time percentage fields add up to 100% (subject to rounding errors). The rework percentage indicates the percentage of time spent in the indicated UI that is spent on rework (e.g., changing already-entered data). If all data is entered correctly the first time, the rework percentage for each UI will be 0%. As can be seen from the result rows 1050A-1050E, the "Create Sales Order" UI takes the most time for the process (30%) and has the highest rework percentage (16%). Accordingly, attention should be paid to the design of this UI and to the training of users of this UI.

Continuous monitoring allows for (close to real-time) dashboards with heatmaps for processes and their steps. This will also enable the monitoring and tracking of change initiatives. The UT 1000 is an example of such a continuous monitoring dashboard. As additional information is gathered using frontend process mining for the order process, the rows 1050A-1050E are updated by the process mining server 125. Additional rows are added in response to detection of additional UIs that are pail of the order process, existing rows are removed in response to detecting that the time percentage for the IA is 0% over a predetermined period of time (e.g., one week or one month), or both.

To identify automation potential, the captured data is analyzed to obtain all the different real-life variations of processes running inside the company (at least the parts covered by UI interactions). Using prior art systems, individuals identify processes that appear to be inefficient. However, there is no objective, reliable, simple, and inexpensive way of identifying which processes should be focused on and which steps to automate. Frontend process mining can provide a heatmap of all (III-based) activities of a process. While backend mining only provides information on what was done when within a process, our approach provides the actual effort and can even classify the automation potential of these activities based on the similarity of all observations of the activity. Furthermore, the most cost-intensive part of the work is usually not done in the backend via batch processing, but by people using the frontend. Thus, understanding how people work in the frontend ensures that the highest automation potential is defined.

To determine automation potential, the average number of clicks and amount of free text entered is analyzed. A UI with no free text (or always the same text) and few clicks (mostly the same checkboxes) has high automation potential. A LA with only a few variations of text in free text fields and only a few clicks and options chosen has medium automation potential. A more complex example of medium automation potential is where two fields have a high correlation. For example, a text field for a country has a finite number of options; a text field for an area code has a very high number of options, but correlates to the country. Accordingly, the area code input could be partially automated by being converted to a combo box with contents based on the country selected in the country field. A UI with many free text fields and where most observations of this activity contained unique text these fields has low automation potential.

Standard process mining is usually based on event logs of some software system. This is often not sufficient to capture the whole business process. People may use other resources as part of their daily work (e.g., web-based tools such as search engines, currency converters, and translators). In contrast to traditional logfile-based backend process mining, frontend process mining will also detect these events. For example, detecting keypresses allows detection of commands like Alt-Tab to change browser tabs and Ctrl-V to paste text instead of typing directly into a text box. As a result, frontend process mining detects the pasting of data from other sources, which cannot be detected by backend process mining. When the application provided is the web browser, the IJRl. of the site providing the text can also be determined. Repeated patterns such as Alt-Tab, Ctrl-V indicate a process step where an integration into another system is tnissing. By contrast, backend process mining has no information on how the user inputs data and thus cannot detect that integration with another system would be helpful. This additional information provides additional opportunity for optimizing business processes and increasing user efficiency. For example, if users often do currency conversion when performing a specific task, the till is modified to include different currencies, thereby improving efficiency and consistency and reducing exposure of data to third parties.

Often, software systems are not integrated, yet they are used in the same business process. Frontend process mining enables detection of relations between software systems that are hard to detect in the backend. Based on the detected relationships, systems are integrated to improve efficiency. If systems are not integrated, it is hard to detect overarching business processes by analyzing backend logs because events in different software systems cannot be correlated (or at least not reliably). Frontend process mining closes this gap as the user is the one integrating different software systems. For example, within one company, invoices are received using software system A and are paid using software system B. The two software systems are not integrated in the backend, but the user opens the UIs of both software systems (in the same browser) and copies data from A to B. Frontend mining can detect such data transfer actions that are not easily comprehensible or automatically mappable from backend logs alone. Based on the observations, the systems are integrated, allowing reduction of errors by replacing human tasks (e.g., the copying and pasting of data) with automated actions.

Frontend process mining data may be shared among multiple companies, allowing comparison of the user interactions and processes of different companies. Similarly, by running the approach globally within a company, the same can be done to compare and benchmark different subsidiaries or locations within a company (e.g., in Germany, the process has usually two more steps but is 5% faster and requires less clicks than in France). This data is used for determining best practices and encouraging alignment of processes in different companies, subsidiaries, or locations.

Similarly, frontend process mining allows business partnerships to share data for processes that are jointly performed. Business interactions between organizations can be measured by combining data about the frontend user efforts with business objects from the back-office software system. This allows the management of the involved companies to focus on streamlining those work efforts in the partnership that cause the highest user efforts (i.e., that drive the highest costs).

Frontend process mining can determine when the monthly average effort of a process step increases significantly (e.g., takes longer to complete the activity, more typing, more iterations in free text fields, or any suitable combination thereof). In response to a detected change in performance of a process step, an administrator is notified to encourage review of the process with the users. For example, new hires may not understand how to most efficiently use a particular UI and training would improve performance.

Frontend: process mining creates a profile of which custom UIs are actually used. For example, if a custom UI that can modify 10 fields is only used for modifying the first one listed in the UI in 95% of the cases, frontend process mining can be used to simplify the custom UI. Additionally, based on the generated profile data for the custom UI, the users can be trained to achieve the same results using the standard UT, thereby allowing a customer to reduce the amount of custom code in the system. This is valuable for the customer since each update of the system could break any of the customizations, which makes them quite expensive to maintain. Additionally, more custom code means additional effort and costs for the customer in maintaining the custom code.

Figure 11:
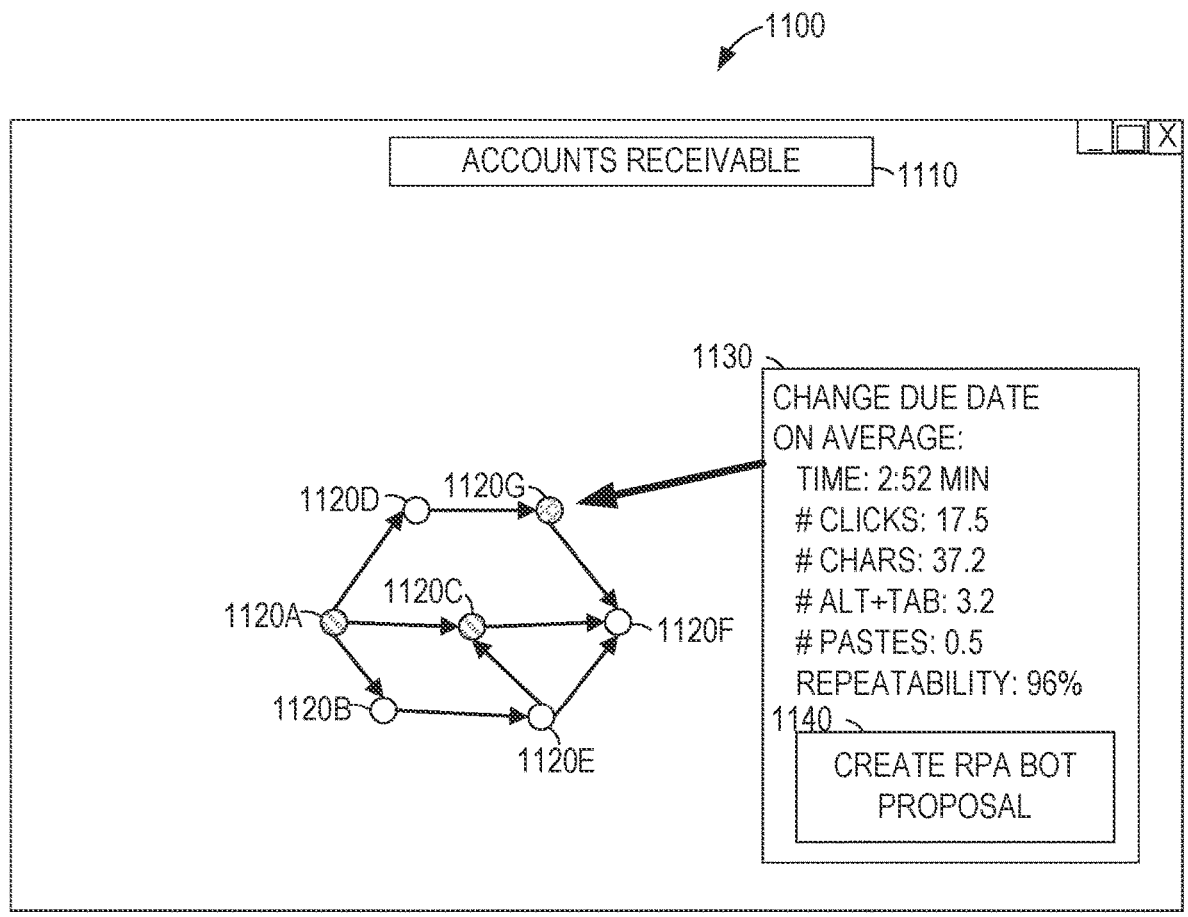
FIG. 11 is a diagram of a UI for displaying a heatmap generated using frontend process mining and receiving a selection of a task for which a bot is to be generated, according to some example embodiments.

FIG. 11 is a diagram of a UI for displaying a process heatmap generated using frontend process mining and receiving a selection of a task for which a bot is to be generated, according to some example embodiments. The UI 1100 includes a title 1110; nodes 1120A, 1120B, 1120C, 1120D, 1120E, 1120F, and 1120G; information area 1130; and button 1140. The title 1110 indicates that the UI 1100 is displaying results of analysis for an accounts receivable process. The UI 1100 is generated using data gathered using frontend process mining.

The nodes 1120A-11.20G represent process steps in the accounts receivable process. The nodes 1120A-11.20G include a visual indicator (e.g., a color, shading pattern, size, or any suitable combination thereof) that provides information regarding the process step represented by the node. The nodes 1120B, 1120D, 1120E, and 1120F are shown in FIG. 11 without a fill pattern, indicating that the corresponding process steps are within expected performance margins. The nodes 1120A and 1120C are shown with a partial fill pattern, indicating that the corresponding process steps are marginally outside of the expected performance band. The node 1120G is shown with a full fill pattern, indicating that the corresponding process step is substantially outside of the expected performance band. A process step being outside of the expected performance bands, and the degree of that deviation, correlates with a likelihood that the process step would benefit from automation due to repetitive tasks with high workloads.

The nodes 1120A-1120G are shown connected by arrows representing the relationships between the corresponding process steps. Thus, the node 1120A, with only outgoing arrows, represents a beginning process step of the process and the node 1120F, with only incoming arrows, represents an ending process step of the process. The beginning process step and ending process step of the process correspond, in some example embodiments, to the start and end of the lifecycle (or a portion of the lifecycle) of the corresponding business object.

In response to a determination that the process step represented by the node 1120E is the furthest out of the expected performance band, or in response to detecting a user selection of the node 1120G, the information area 1130 is displayed. The information area 1130 identifies the process step represented by the node 1120G and includes information about the process step. In the example of FIG. 11, the information shown includes the average time to complete the process step, the average number of clicks to complete the process step, the average number of characters typed to complete the process step, the average number of Alt-Tab key combinations (the Windows key combination to change active windows) detected during the process step, the average number of paste actions (indicating data from another source was used), and the repeatability percentage of the process step.

Figure 12:
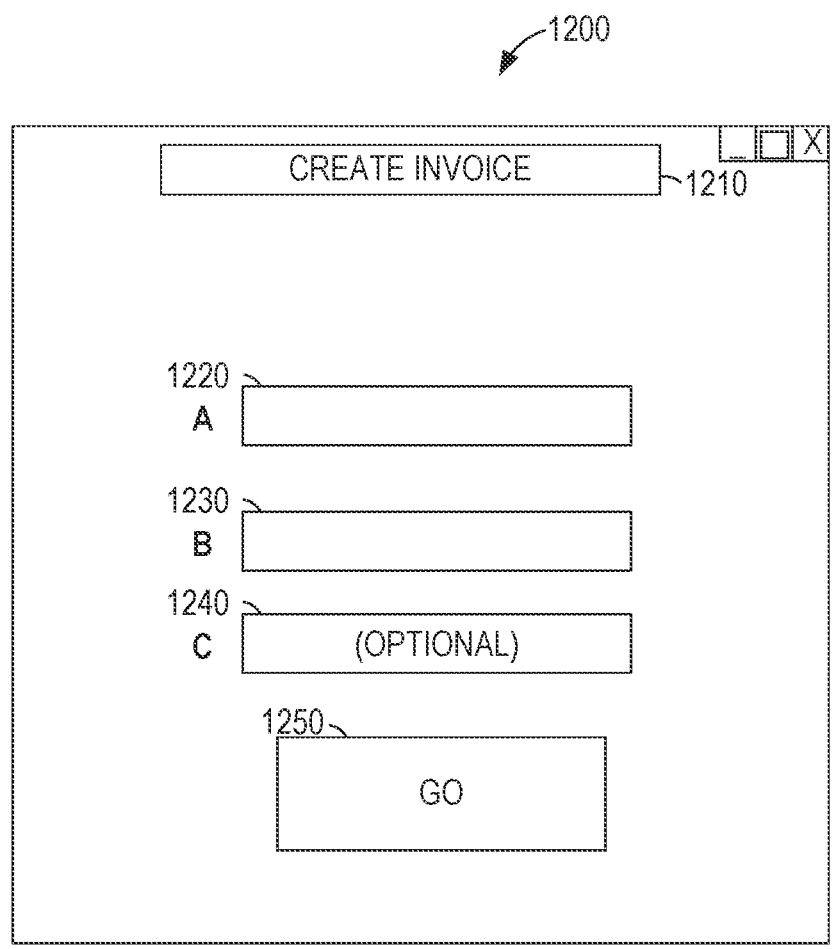
FIG. 12 is a diagram of a UI for providing parameter values to a bot, according to some example embodiments.

The button 1140 is operable to cause the bot generation server 135 to generate a bot to perform the process step of the node 1120G, based on the observed behavior of the process step (e.g., its clickstreams). In some example embodiments, the UI 1100 is presented to a digital transformation officer (DTO) that selects a task for automation, FIG. 12 is a diagram of a UI 1200 for providing parameter values to a bot, according to some example embodiments. The UI 1200 includes a title 1210; text fields 1220, 1230, and 1240; and button 1250. The title 1210 indicates that the UI 1200 is displaying fields for a process to create an invoice. The UI 1200 is generated by a bot generated using data gathered using frontend process mining.

The text fields 1220-1240 receive parameter values for the invoice creation bot. The text field 1240 is marked as optional. Accordingly, the bot can be used with a default value for a parameter corresponding to the text field 1240 or the user can provide another value for the parameter. Operation of the button 1250 causes the but to proceed, providing input to an invoice creation UI based on default parameter values, values provided in the text fields 1220-1240, or any suitable combination thereof. In some example embodiments, operation of the button 1250 opens the invoice creation UI (e.g., SAP MIRO) as a background process and RPA takes over the task.

In some example embodiments, the default value for a parameter is presented as a pre-filled field (e.g., the default value is pre-filled in the text field 1220). By clicking on the field, the pre-filled value is removed and, if available, other values observed at least a predetermined number of times (e.g., at least 5 times or in at least 10% of the observations) are presented for selection.

The RPA handles the business process, allowing the user to perform other tasks. For example, the RPA deals with the loading times of UIs and subscreens, entering data into data fields, and so on, instead of the user. The UI 1200 requests fewer values than the UI being automated. By replacing the original interactive process with the single UI 1200, substantial time is saved by use of the UI 1200. Additionally, distinct use cases may be extracted and a different bot created for each use case, even when the same screens (or overlapping sets of screens) of the underlying application are used to perform each of the distinct use cases. By presenting the UI 1200 for the bot for the use case selected by the user, only the parameters actually used for the use case are presented, further simplying the user interaction for the user.

Additionally, the LI 1200 may provide form validation based on the frontend process mining data gathered from user interactions of the UI being automated. For example, if the user enters an invalid value into the text field 1220, a pop-up window is presented that informs the user that the value is invalid and requests the user to provide a different value.

Figure 13:
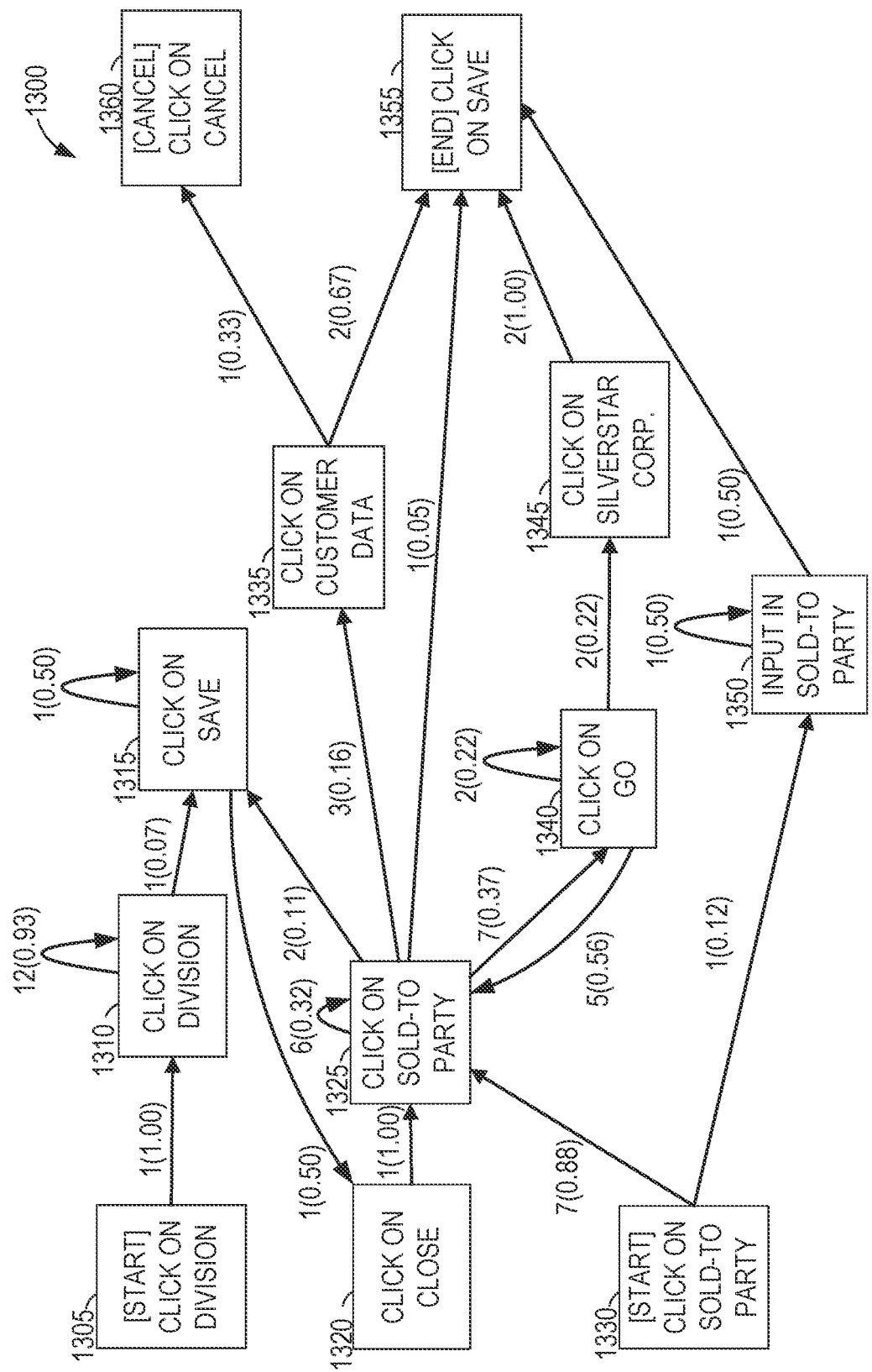
FIG. 13 is a task flow diagram based on observed behavior, according to some example embodiments.

FIG. 13 is a task flow diagram 1300 based on observed behavior, according to some example embodiments. The task flow diagram 1300 shows behaviors 1305, 1310, 1315, 1320, 1325, 1330, 1335, 1340, 1345, 1350, 1355, and 1360 along with the relationships between pairs of the behaviors. The relationships are shown as arrows, indicating a sequence of behaviors that was observed at least a number of times equal to a predetermined threshold (e.g., at least once or at least twice) Data next to each arrow shows the number of observations of the sequence along with a probability of the sequence occurring. For each behavior, additional data exists (e.g., an identifier of the part of the UI in the DOM that was interacted with, which text was inserted, which option was selected, or any suitable combination thereof). Although 11 behaviors are shown in the task flow diagram 1300, this is a simplified example for illustration purposes and practical task flows often include dozens of behaviors.

Behaviors 1305 and 1330 are marked [START], indicating that these behaviors are starting points for the illustrated task flow of a "Create Sales Order" task. Behavior 1355 is marked [END], indicating that this behavior is a successful ending point for the illustrated task flow. Behavior 1360 is marked [CANCEL], indicating that this behavior is an unsuccessful ending point for the illustrated task flow. By following the arrows from the [START] behaviors to the [END] behavior, a possible sequences of behaviors to perform the task successfully are found. Sequences that include fewer behaviors are more efficient.

The sessions that end in CANCEL indicate that the user is throwing away work already done. If the number or percentage of such sessions exceeds a predetermined threshold, a notification is generated to the administrator to inform the administrator that users are struggling with the process step.

By considering the numbers next to the arrows, the most common sequence of behaviors that successfully completes the task can be determined. For example, beginning with behavior 1330, the most common following behavior is behavior 1325, with six observations out of seven (the remaining observation being that behavior 1350 follows behavior 1330). Then, with seven observations, the next behavior is behavior 1340.

The most common behavior from behavior 1340 is a return to behavior 1325. As shown by the arrows connecting behaviors 1325 and 1340, a user could repeat this sequence indefinitely. Similarly, the arrow from behavior 1325 pointing back to behavior 1325 shows that a user could repeatedly perform this behavior. Nonetheless, every successful completion of the task ends with an [END] behavior.

In some example embodiments, the bot generation module 450 selects a path through the task flow diagram 1300 by applying the following steps. First, the bot generation module 450 determines all logical dependencies from the clickstreams (e.g., in case a subscreen has to be selected to finalize the task). Second, the bot generation module 450 determines which clicks and inputs can be performed in arbitrary order (e.g., based on having observed different orders of execution in the clickstreams). Third, the bot generation module 450 identifies a path that conforms to the dependencies and degrees of freedom identified and, thus, would be able to replicate the result of most or all observed clickstreams. For example, the bot generation module 450 may generate a bot that, by default, follows the sequence of behaviors 1330, 1325, 1340, 1345, 1355.

FIG. 14 is a data table 1400 showing statistics for a task based on observed behavior, according to some example embodiments. The data table 1400 includes rows 1405, 1410, 1415, 1420, 1425, and 1430 and columns 1435, 1440, 1445, 1450, 1455, 1460, 1465, 1470, and 1475. Each of the rows 1405-1430 contains statistical data for a different measure regarding the task: number of clicks, duration (in milliseconds), length of keyboard input, number of pastes, number of keystrokes, and number of tab switches. Each of columns 1435-1475 contains a different type of statistical data: maximum, mean, median, minimum, number of observations, value at the fifth percentile, value at the fiftieth percentile (same as median), value at the ninety-fifth percentile, and standard deviation.

In some example embodiments, additional statistical data is generated, such as values at the twenty-fifth and seventy-fifth percentiles or the total of the measure across all observations. The statistical information for each task can be used to generate a heatmap as shown in FIG. 11. Nodes in the UI 1100 are selected for highlighting to the user based on one or more of the statistical measures for the corresponding task. As an example, tasks with low median durations but substantially higher durations at the seventy-fifth percentile are selected for highlighting to indicate that the task can be performed efficiently but often is not. As another example, tasks with median durations at least a predetermined multiple (e.g., double, triple, or five times) of the average duration of tasks in the process are selected for highlighting.

FIG. 15 is a diagram of a UI 1500 for displaying raw events, according to some example embodiments. The UI 1500 includes a title 1510, a type colum 1520, an event column 1530, and a time column 1540. Each column includes a title row and six data rows. In some example embodiments, additional data rows are available to be shown and the UI 1500 scrolls the data rows in response to receiving a user input. The title 1510 indicates that the UI 1500 is showing raw event data.

Each data row shows information for a single event. The type column 1520 shows an icon that indicates the type of the event, the event column 1530 shows a description of the event, and the time column 1540 shows the date and time of the event. For example, the first data row shows an event of type application-switch, in which the user left the app to change to a web browser displaying data from https://help.sap.com at 11:40:56 GMT on May 3, 2019. The fourth data row shows an event of a user entering the text "1018" into a field with the label "Invoicing Party" at 11:40:40 GMT on May 3, 2019. The remaining rows show mouse click events on various fields at various times.

Additional controls may be displayed to enable the user to select filtering options for the LI 1500. For example, the displayed events may be of a selected type (e.g., mouse click, keyboard input, or application-switch), may be events for a selected type of business object (e.g., invoice or account payable), may be events that occurred within a selected time range, or any suitable combination thereof.

Figure 16:
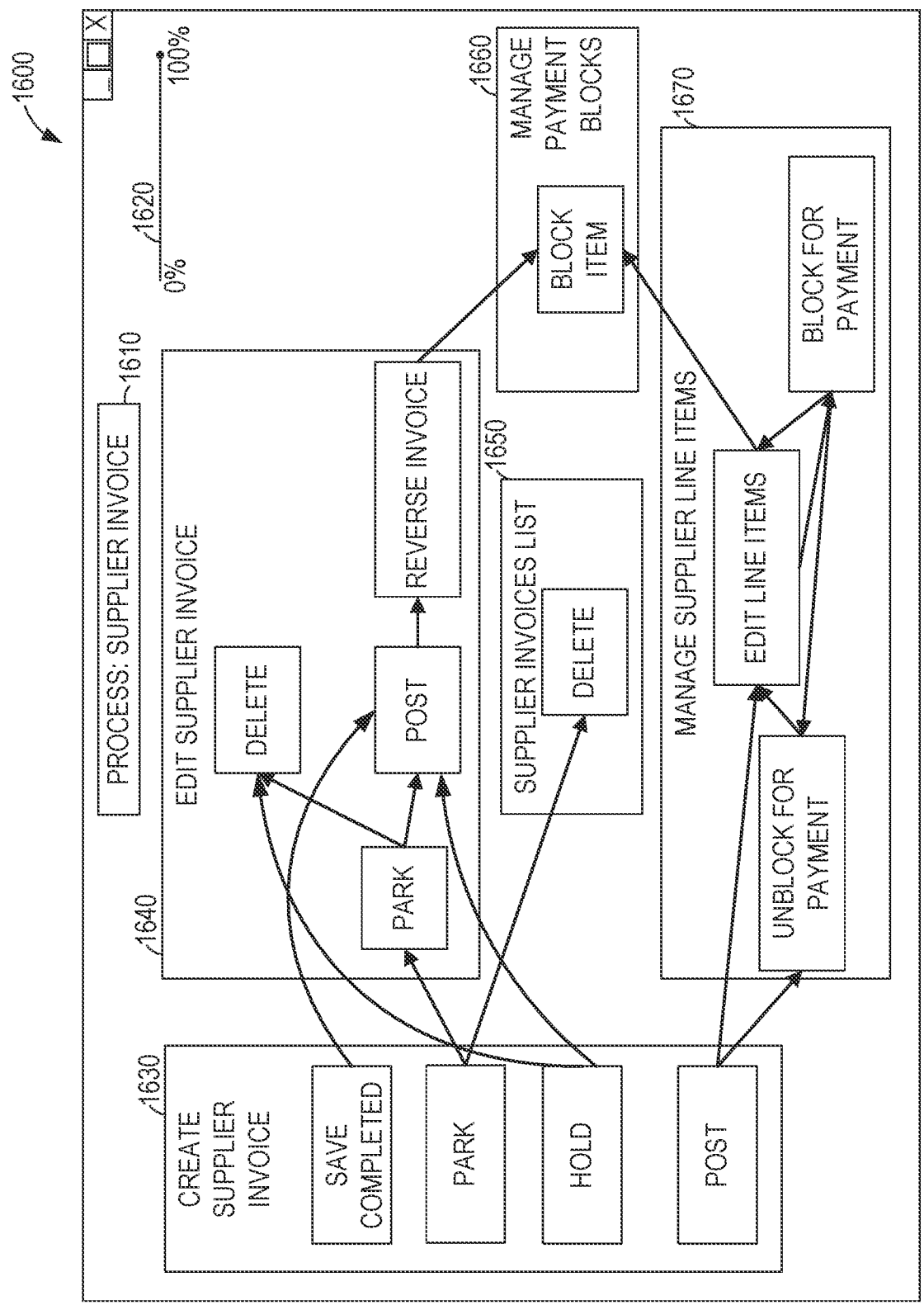
FIG. 16 is a diagram of a UI for displaying a process, according to some example embodiments.

FIG. 16 is a diagram of a UI 1600 for displaying a process, according to some example embodiments. The UI 1600 includes a title 1610, a percentage selector 1620, and regions 1630, 1640, 1650, 1660, and 1670. The title 1610 indicates that the UI 1600 is displaying information about a supplier invoice process. The percentage selector 1620 indicates that 100% of steps used in the process are displayed. In response to receiving a user input lowering the percentage, steps are removed from the display, with the least frequently used steps removed first. In some example embodiments, the steps that are displayed are those that are used in at least (100-<selector value>)% of the process iterations. Thus, with the slider set at 100, steps used in at least 0% of the iterations (i.e., steps that appear in any iteration at all) are displayed; with the slider set at 0, only steps used in 100% of the iterations are displayed.

Each region 1630-1670 corresponds to a UI in the process and includes one or more process steps. The process steps are connected by arrows that indicate the sequence of steps taken. Thus, one possible process sequence begins with the Save Completed step of the Create Supplier Invoice UI, proceeds to the Post step of the Edit Supplier invoice UT then to the Reverse Invoice step of the same UI, and then terminates with the Block Item step of the Manage Payment Blocks UI.

The user interface module 320 identifies a connection between a business object (and its process) and a process instance via the identifier of the business object. For example, a specific UI such as Edit Supplier Invoice may be used for different process steps. The user interface module 320 clusters these process steps inside the region 1640 representing the Edit Supplier Invoice UI. By contrast, in the UI 1100 of FIG. 11, the focus is on highlighting the most important process step which would benefit from a bot.

Figure 17:
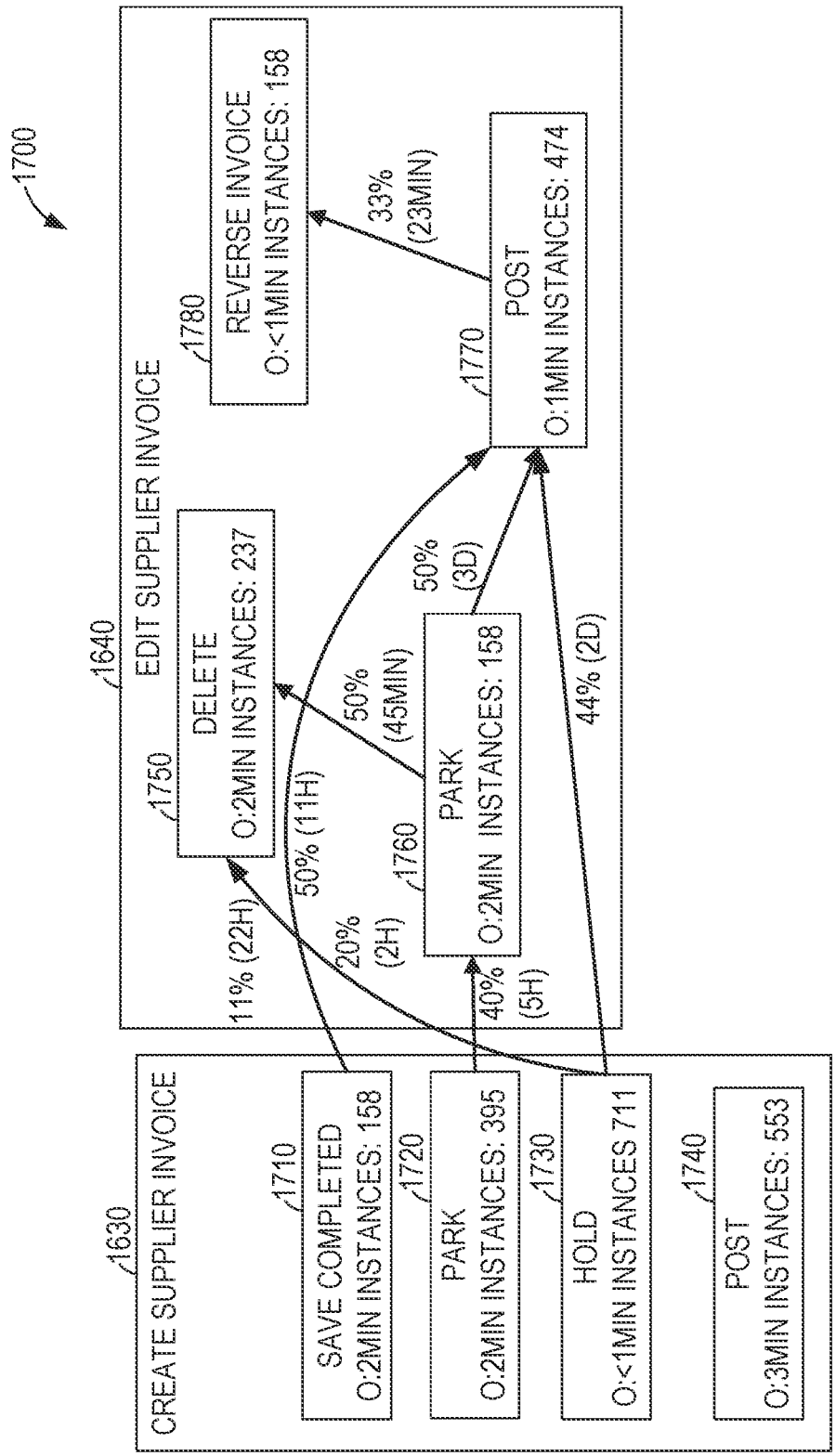
FIG. 17 is a diagram of a portion of a UI for displaying a process, according to some example embodiments.

FIG. 17 is a diagram of a portion 1700 of the UI 1600 for displaying a process, according to some example embodiments. The portion 1700 includes the regions 1630 and 1640; and step elements 1710, 1720, 1730, 1740, 1750, 1760, 1770, and 1780.

The step elements 1710-1780 include the name of the step, the average time taken to complete the step, and the number of instances of the process that included the step. The arrows connecting the steps indicate transitions between steps and are labeled with a percentage of outgoing transitions from the first step and the average time it took until the subsequent step was observed. The number of instances includes loops. For example, in the region 1670 of FIG. 16, one possible process flow is from the Edit Line Items step to the Block For Payment step and back. Each time this loop is processed, the number of instances for both s is incremented.

Figure 18:
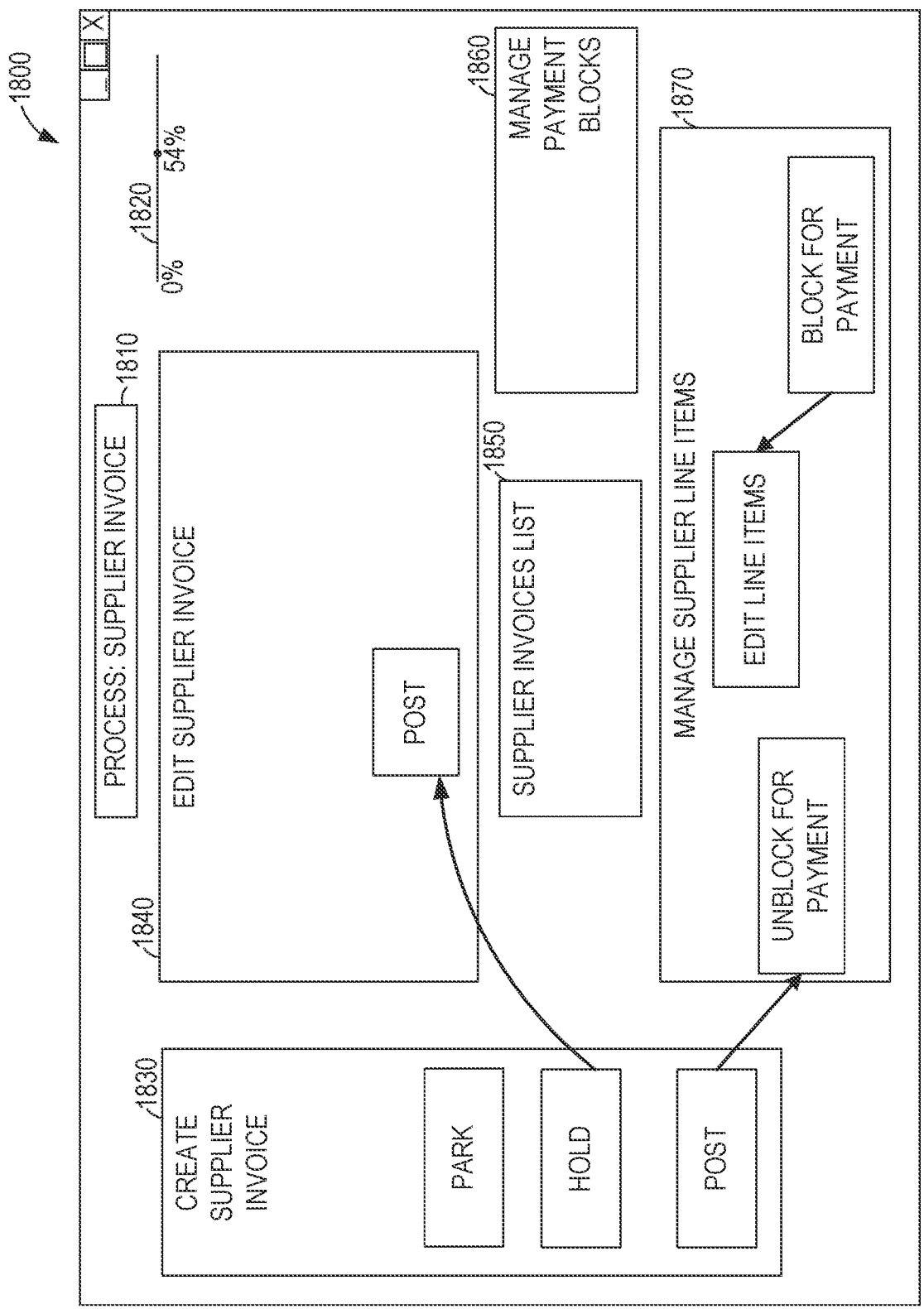
FIG. 18 is a diagram of a UI for displaying a process, according to some example embodiments.

FIG. 18 is a diagram of a UI 1800 for displaying a process, according to some example embodiments. The UI 1800 includes a title 1810, a percentage selector 1820, and regions 1830, 1840, 1850, 1860, and 1870. The title 1810 indicates that the UI 1800 is displaying information about a supplier invoice process. The percentage selector 1820 indicates that 54% of steps used in the process are displayed. The UI 1800 may be displayed after the percentage selector 1620 is adjusted from 100% to 54%.

Each region 1830-1870 corresponds to one of the regions 1630-1670 and to a in the process. The process steps are connected by arrows that indicate the sequence of steps taken. Transitions are shown only between pairs of process steps that are both displayed based on the value of the percentage selector 1820. Thus, the lack of outgoing transitions from the Park step of the Create Supplier Invoice UI (corresponding to the region 1830) indicates that the Park step was observed in at least 54% of the instances of the process, but no following step was observed in at least 54% of the instances.

Figure 19:
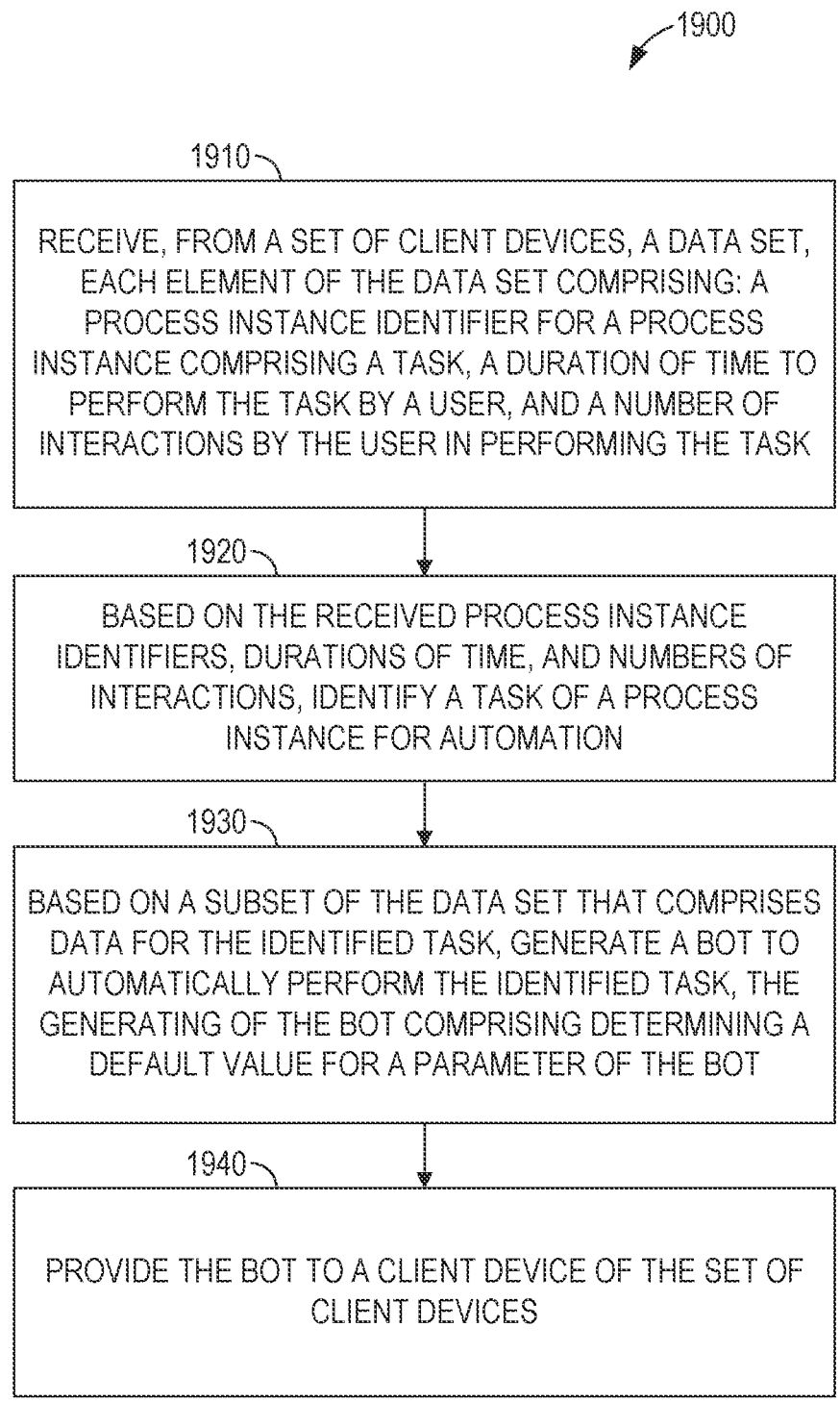
FIG. 19 is a flowchart illustrating operations of a method suitable for generating a bot based on observed behavior, according to some example embodiments.

FIG. 19 is a flowchart illustrating operations of a method 1900 suitable for generating a bot based on observed behavior, according to some example embodiments. The method 1900 includes operations 1910, 1920, 1930, and 1940. By way of example and not limitation, the method 1900 is described as being performed by the devices, modules, and databases of FIGS. 1-6.

In operation 1910, the process mining module 330 receives, from a set of client devices (e.g., the client devices 160A-160B), a data set, each element of the data set comprising a process instance identifier for a process instance comprising a task, a duration of time to perform the task by a user, and a number of interactions by the user in performing the task. In an example embodiment, a user of the client device 160A enters, in ail, quotation data for a sales quote to a customer, in a step of a process of creating a sales order. The frontend capture module 230 of the client device 160A stores the duration of time and number of interactions of the user with the UI in the process of entering the quotation data. After the quotation data is entered, the frontend capture module 230 and the process mining module 330 communicate so that the application server 120 receives the data, including a process identifier for the process instance. The process instance identifier may be an identifier for a business object (e.g., in the business object table 540). This process is repeated by users of other client devices (e.g., the client device 160B) so that, in the aggregate, the process mining module 330 receives the data set. The received data may be stored in the mined data table 510 of FIG. 5.

Alternatively or additionally, data is reported from the client device in response to an elapse of time or closing the UI instead of being reported in response to completion of a step in the business process. For example, if the business process step being attended to is entry of the quotation data shown in FIG. 8, the data received in operation 1910 may be received after all quotation data is entered, after a period of time is spent in the UI, or after the user closes the UI. In the latter two cases, the frontend mining data received reflects an incomplete task. Thus, in order for the process to be complete, a user will need to return to the UI and complete the incomplete step of the process. Nevertheless, by collecting these occurrences and correlating them with the process flow, hot spots of wasteful activities (e.g., activities which are started but canceled several times) can be identified and, subsequently, addressed.

The frontend capture module 230 of the client device 160 captures data for provision in operation 1910. In some example embodiments, the frontend capture module 230 uses an observation timer that begins at 0 at the time the UI is presented. Each time the user clicks on any element, the current timestamp, the location in the DOM, and the object are stored as well as any changes resulting from the interaction (e.g., state change of a checkbox or radio button). In some example embodiments, the frontend capture module 230 stores the whole DOM tree when the UI is first presented and after each interaction. By comparing the DOM tree from before the interaction with the DOM tree after the interaction, changes in the DOM tree caused by the interaction are determined. Additionally, each time the user uses the keyboard, this is also tracked: timestamp, raw data typed into the UI, which element in the UI was active at the time, and changes to the DOM caused by the keyboard use.

Based on the received process instance identifiers, durations of time, and numbers of interactions, the process identification module 430 of the bot generation server 135, in operation 1920, identifies a task of a process instance for automation. For example, a design goal may be to keep the number of interactions with a UI less than twice the number of fields contained in the UI. The process identification module 430 identifies the task for automation in response to determining that the average number of interactions taken to complete the task. In some example embodiments, the identified task is highlighted in a heatmap UI (e.g., the UI 1100 of FIG. 11) and the identification of the task comprises receiving a selection of the task by a user.

In operation 1930, in response to the identification or selection of the task, the bot generation module 450 generates a bot to automatically perform the identified task, with the generating of the bot comprising determining a default parameter value for a parameter of the bot by the parameter value selection module 430. The generated bot is based on the observed behaviors of the users and is parameterized to be able to perform any observed successful performance of the automated task. Default values of the parameters are selected by the parameter value selection module 430 to reduce the average modification of parameters by users. As an example, the most popular parameter values are selected as defaults. The default values are pre-selected when the bot is run, but may be overridden by the user. In the example of FIG. 12, the default values are pre-filled in the text fields of the UI 1200.

In some example embodiments, the bot generation module 450 generates a parameter validation code for the parameter based on the data set. The parameter validation code includes a list of acceptable values for the parameter, a range of acceptable values for the parameter, a list of unacceptable values for the parameter, a range of unacceptable values for the parameter, or any suitable combination thereof. If a user enters an unacceptable value for the parameter or does not enter an acceptable value for the parameter, the parameter validation code prompts the user to confirm the parameter value. The bot generation module 450 selects the acceptable values, the unacceptable values, or both based on the data set. For example, the upper and lower observed values of a numeric field may be used as upper and lower bounds of a range for a corresponding parameter. In another example embodiment, upper and lower bounds are defined as two standard deviations from the mean. In yet another example embodiment, upper and lower bounds are defined as the fifth and ninety-fifth percentile values of the observed data entries.

Generation of the bot may include determining a relationship between multiple fields of a UI. In one example embodiment, two fields have the same value in every observed instance. Thus, the bot may be configured to use a single parameter for both fields. Alternatively, the bot may be configured to use two parameters, but to automatically set them to the same value unless this behavior is overridden by the user. In another example embodiment, one field always has a value equal to the sum of two other fields. Thus, the bot may be configured to use parameters for the two fields being summed and automatically generate the sum for the field holding the sum. Alternatively, the bot may be configured to use three parameters, wherein the value of one parameter is automatically generated from the values for the other two unless this behavior is overridden by the user. Similarly, one field may always have a value equal to a concatenation of two other fields. Thus, the bot may be configured to use parameters for the two fields being concatenated and automatically generate the concatenation for the third field.

Based on observations of context switches (Alt-Tab in Windows), placeholder steps may be inserted into the hot that allow the user (e.g., the DTO) to modify the bot based on expert knowledge. For example, if a majority of the process flows include a context switch followed by a paste of data into an input field, the bot generation module 450 deduces that the common task flow is to copy and paste data from another application, but the identity of that application may not available to the bot generation module 450. If the data is being copied from a known portion of a file, for example, the user may modify the placeholder step into a file selector and program the bot to copy and paste the known portion of the selected file. The placeholder may indicate the percentage of observations that included the use of the external data, source of the external data, or any suitable combination thereof. For example, data copied from an Excel spreadsheet is identifiable based on control characters included in pasted data and Excel may be identified as the data source in the placeholder.

The communication module 410, in operation 1940, provides the bot to a client device of the set of client devices. Thereafter, the bot execution module 240 executes the bot to automate the task. For example, the application server 120 may provide instructions that are executed on the client device to cause presentation of a UI (e.g., a web page) for performing the identified task. In response to detecting the presented UI corresponding to the identified task, the client device executes the bot. The hot, when executed, interacts with the UI by generating mouse moves, mouse clicks, keystrokes, or any suitable combination thereof.

Executing the bot may include receiving, by the bot, interactive user input to modify one or more default values; accessing, by the bot, data from a data file to modify one or more default values; or both. Accessing data from a data file to modify default values may include processing a known field location in the data file using optical character recognition (OCR). For example, a portable document format (PDF) file may contain an invoice of a known format wherein the name and address of the debtor are placed at known locations e.g., locations identified by pixel offsets from a corner of a page, locations identified by percentage offsets from a corner of a page, locations identified by physical offsets (e.g., inches or centimeters) from a corner of a page, or any suitable combination thereof). The bot may cause the known portion of the data file to be processed using OCR and use the resulting text as the parameter value.

Thus, by use of the method 1900, interactions by different client devices in different process instances are aggregated to generate a set of data that applies to the process. By analyzing this data set, tasks within the process that benefit from automation are identified and automated. By comparison with manual processes, time and effort is saved by using automation to create the hots. Furthermore, since the automation is based on the observed behaviors, rather than just a single Observation, the generated bot is better suited for the variety of use cases actually encountered by users, further saving time and effort of users of the bot and computing resources involved in manual correction of bot default actions.

It should be noted that processes may include optional or alternative steps that are not performed in every iteration of the process. Accordingly, multiple execution paths for the process may exist. Over time, the complete state space of the process is observed and mapped using this approach. Thus, the frontend process mining solution described herein is automated and scalable. Every state the process can be in during its execution and all the different activities that have been observed in their varying frequencies in these states are combined into a process graph (as shown in FIG. 13). The process graph comprises activities as vertices and relations between activities as edges. Based on the process graph, a heatmap-like indication of anomalies is generated (as shown in FIG. 11).

By collecting the frontend process data, the frontend process mining server 125 provides analytics over sets of observations belonging to one process step (as shown in FIG. 14). For instance, after having observed "Change Due Date" in Accounts Receivable 250 times, the frontend process mining server 125 provides averages and standard deviations for (but not limited to): duration between start and completion of the activity, number of mouse clicks, number of typed characters, number of context switches (Alt-Tab on Windows), number of COPY actions (Ctrl-C on Windows), number of PASTE actions (Ctrl-V on Windows), number of PASTE actions where the pasted content came from somewhere else (e.g., in the we observed a PASTE, but the COPY took place in another application such as Excel). This indicates that the LI utilizes information from another source. Based on frontend mining, the parameter value selection module 430 can analyze whether the values pasted in this UI are identical each time, whether they are values from a small set (e.g., of less than 10 values), or if this is free text. Additionally, repeatability (percentage of occurrences in which input is the same or determinable from the process instance) is determined as an indication of how easy it would be to automate the process activity. Repeatability may be used as part of the criteria for selection of the nodes to highlight in the UI 1100.

As a first example of determining repeatability, one task includes filling in a form with five fields. The repeatability of a task is the weighted sum of the repeatability of the fields used by the task. A field that has a constant value is 100% repeatable. A field that has a determinable value or a value that is usually, selected from a small number of possible values has an intermediate repeatability (e.g., 50%). A field that is essential)/unpredictable is 0% repeatable. Thus, if, in every observation, four of the fields have the same values across observations and the remaining field is completely unpredictable, the repeatability would be 80%.

As a second example of determining repeatability, a second task also includes filling in a form with five fields. If, in 90% of observations, one field has a value that is the same across observations or is determinable from the process instance of the task and the remaining four fields have constant or determinable values, the repeatability would be 90%. Thus, 90% of the time, the values of all fields can be determined based solely on information available from prior instances of the task and data available based on the process instance. Only 10% of the time would additional user input be needed to execute the hot.

Some applications list several different instances of the same type of business object. For these applications, a new UI interaction and process step starts as soon as the user selects another business object instance (e.g., the first invoice in a list of invoices). The user actions are saved while the user is interacting with the selected business object instance (e.g., setting three fields of the invoice). When the user saves or submits the changes and selects the next business object instance (e.g., the second invoice in the list), a new activity in another process instance begins. For both distinct activities, the frontend capture module 230 captures the data to recognize the process instance (e.g., invoice identifier), identify the changes created by the user, and store the complete clickstream of the users actions in creating the changes.

Some generated bots handle tasks that are 100% repeatable and can be executed with no direct user input. A first set of inputs are static across all instances, a second set of inputs are determinable from the state of the business object e.g., a checkbox that is always checked when the business object is in a certain state), and a third set of inputs require input. For generated bots having the third set empty, the bots are fully automatic. Such bots can be generated based on observations with high degrees of repetition and handed over directly to the bots' execution environment (e.g., SAP's RPA Studio) without further user configuration.

Fully automatic bots may be run automatically in response to a triggering event (e.g., receipt of an email is received that matches a predetermined filter pattern). Another example triggering event would be a timer (e.g., a timer that triggers once a day or once each hour). When the timer triggers, a query is run on a database to identify one or more business objects on which the bot is run.

Figure 20:
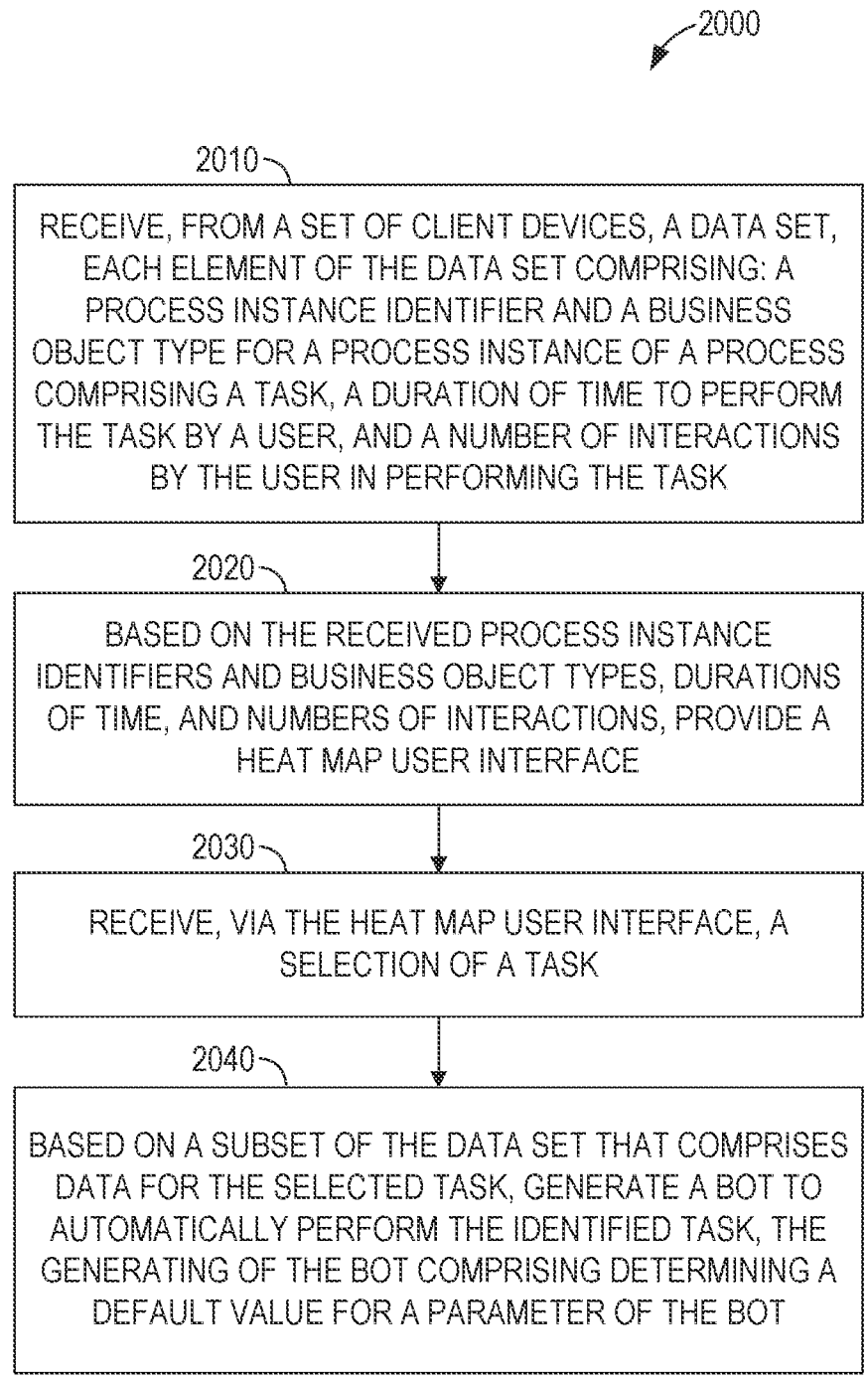
FIG. 20 is a flowchart illustrating operations of a method suitable for generating a hot based on observed behavior, according to some example embodiments.

FIG. 20 is a flowchart illustrating operations of a method 2000 suitable for generating a bot based on observed behavior, according to some example embodiments. The method 2000 is an alternative to the method 1940 and includes operations 2010, 2020, 2030, and 2040. By way of example and not limitation, the method 2000 is described as being performed by the devices, modules, and databases of FIGS. 1-6.

In operation 2010, the process mining module 330 receives, from each of a set of client devices, data comprising a process instance identifier and a business object type for a process instance of a process comprising a task, a duration of time to perform the task by a user, and a number of interactions by the user in performing the task. The data for the client devices is aggregated to form a data set, wherein the process instances may differ but the process is the same. For example, each client device may report data for process steps of the company's accounts payable process even though the actual instances differ due to being for different accounts.

In some example embodiments, DOM data for the UI is received. The DOM data identifies the UI (e.g., via a "title" element) and the elements of the UI (e.g., text display elements, text input fields, drop-down selectors, text input fields, and the like). The DOM data also identifies interrelationships between the UI elements. For example, the relationship between a text display element and a text input field that are contained within a single container object are included in the DOM data. The data for each client device identifies types of interactions (e.g., clicks, keypresses, menu selections, and the like) and the UI element with which each interaction is associated. In these example embodiments, a timestamp for each user interaction is included in the data. Thus, analysis of the data received in operation 2010 allows for reconstruction of the sequence of interactions with the UI, the amount of time taken in interacting with each UI element, the number of times a single UI element is interacted with, and so on.

In some example embodiments, a title of the UI is retrieved from the DOM data and a text search is performed on the title. If the title includes the name of a business object, the business object is identified for the UI. For example, UIs entitled "Create Invoice," "Pay invoice," and "Edit invoice" all match the text "Invoice," which is the name of a type of object (as shown in the process type table 610 of FIG. 6). Using the process type table 610, the process mining module 330 determines that the process type for all three of these UN' is "Accounts Payable." in some example embodiments, a dictionary of synonyms is used if no object type names match the title. For example, "bill" may be listed as a synonym for "invoice," allowing a UI entitled "Update Bill" to be found as a match for an invoice business object.

The process instance is determined based on the specific data being manipulated by the UI. After determining that the primary business object being manipulated has the business object type of "invoice," the DOM data is searched to find an identifier of an invoice. Thus, the process instance corresponds to the specific business object being manipulated and the process corresponds to the type of business object being manipulated.

Based on received process instance identifiers and business object types, durations of time, and numbers of interactions, the UI module 420 provides, in operation 2020, a heat map UI. For example, the UI 1100 may be provided, indicating the tasks performed in the process and their relationships and highlighting the tasks that would most benefit from automation, as determined from analysis of the received data. In some example embodiments, tasks that take longer than the mean of tasks for the process and have repeatability above the mean of tasks for the process are highlighted as benefiting from automation.

The UI module 420 receives, via the heat map UI, a selection of a task (operation 2030). For example, a user may select the node 1120G to cause additional information about the corresponding task to be displayed and then operate the button 1140 to send the selection of the task received in operation 2030.

The bot generation module 450, in operation 2040, based on a subset of the data set that comprises data for the selected task, generates a bot to automatically perform the identified task, with the generating of the bot comprising determining a default value for a parameter of the bot. As discussed above with respect to operation 2010, the received data set includes data for a plurality of tasks for the process. However, since only one task is being automated, only the subset of the data set that relates to the selected task is used to generate the bot that performs the task.

Since each activity in the process graph corresponds to a non-empty subset of the observed activities of this process, the bot generator can be triggered with this subset to generate a bot that conforms to most if not all of these observations. An observation in this context is a clickstream of where the user clicked (type of element, location in the DOM tree), what the user entered in which field, timestamps for each atomic interaction with the UI, and an explicit order of these interactions.

'The bot generator uses process mining on the subset of observations of this activity to perform one or more of: identifying the different variations of how the activity was performed (e.g., entering data in the "NAME" field first vs. checking a specific checkbox first) based on the execution order of the users' interactions with the UI; identifying dependencies within the clickstreams of the observed activities (e.g., identify an additional field for entering data that only shows up after a specific UI element was clicked); computing the interaction paths which lead to a successful termination of the activity and derive an execution order which conforms to most if not all of these; and determining metrics to lower/optimize for: time required, number of clicks, amount of text entered, or any suitable combination thereof. As a result, the bot generator creates an executable but definition that can be run in an execution environment for RPA bots (e.g., SAP's Intelligent RPA Studio).

To be able to perform multiple sequences of behaviors, the generated bot is parameterized. In other words, the user running the bot is enabled to provide parameters to the bot to control the bat's behavior. One or more of the parameters has a default value. The default value is used unless overridden by the user. By selecting as the default value the most commonly used value, the most user effort in entering a parameter is saved. The mined data table 510 may be used by the parameter value selection module 430 to determine details of the observed user interactions (e.g., in the clickstream data). These details are used to determine the default values of one or more parameters.

The generated hot and default parameter values may be presented in a LA to an administrator for review. After approval or modification of the proposed bot, the but is provided to one or more users, as described above with respect to operation 1940 of FIG. 19.

Below is example code that may be used to generate the bot.

```
# #### Strategy
# For every change (each set / change / delete), see what clicks are before
it in *every* trace that contain this change = hard requirements.
def get_hard_requirements(param):
    grouped_ts = groupby(list(schema['CleanLog_dev'].find({'metadata.id':
{'$in': trace_ids}})), lambda x: x.get('metadata').get('id'))
    traces = [ ]
    for _, t in grouped_ts:
        traces.append(list(t))
    traces_cut_after_param_occured = [ ]
    for trace in traces:
        trace.sort(key = lambda x: x.get('timestamp'))
        try:
            cutoff_index = [idx for idx, x in enumerate(trace) if
x.get('uicomponentID') == param][0]
            traces_cut_after_param_occured.append(trace[:cutoff_index])
        except:
            pass
    unique_requirement_candidates = list(set([item['uicomponentID'] for
sublist in traces_cut_after_param_occured for item in sublist]))
    if len(unique_requirement_candidates) == 0;
        return
    gr = Graph(len(unique_requirement_candidates))
    for trace in traces_cut_after_param_occured:
        prev = None
        for click in trace:
            if prev is not None:
                gr.addEdge(prev,
                unique_requirement_candidates.index(click['uicomponentID']))
            prev = unique_requirement_candidates.index(click['uicomponentID'])
    return [unique_requirement_candidates[i] for i in gr.topologicalSort( )]
# ### Compute Hard requirements for every change
# Return list that contains tuple of (parameter, requirements) where
parameter is input field id and requirements are the clicks necessary to
make before the input is filled
flat = [ ]
hard_requirements = [ ]
for change in changes:
    result = get_hard_requirements(change['id'])
    if result is not None:
        flat.append(change['id'])
        flat = flat + result
        hard_requirements.append((change['id'], result))
flat = list(set(flat))
# ### Given list of hard requirements for every parameter, compute
sequence of actions that satisfies all hard requirements
g = Graph(len(flat))
for para, reqs in hard_requirements:
    prev = None
    for req in reqs:
        if prev is not None:
            g.addEdge(flat.index(prev), flat.index(req))
            g.addEdge(flat.index(req), flat.index(para))
        prev = req
sort = g.topological Sort( )
for i in sort:
    print(flat[i])
```

Figure 21:
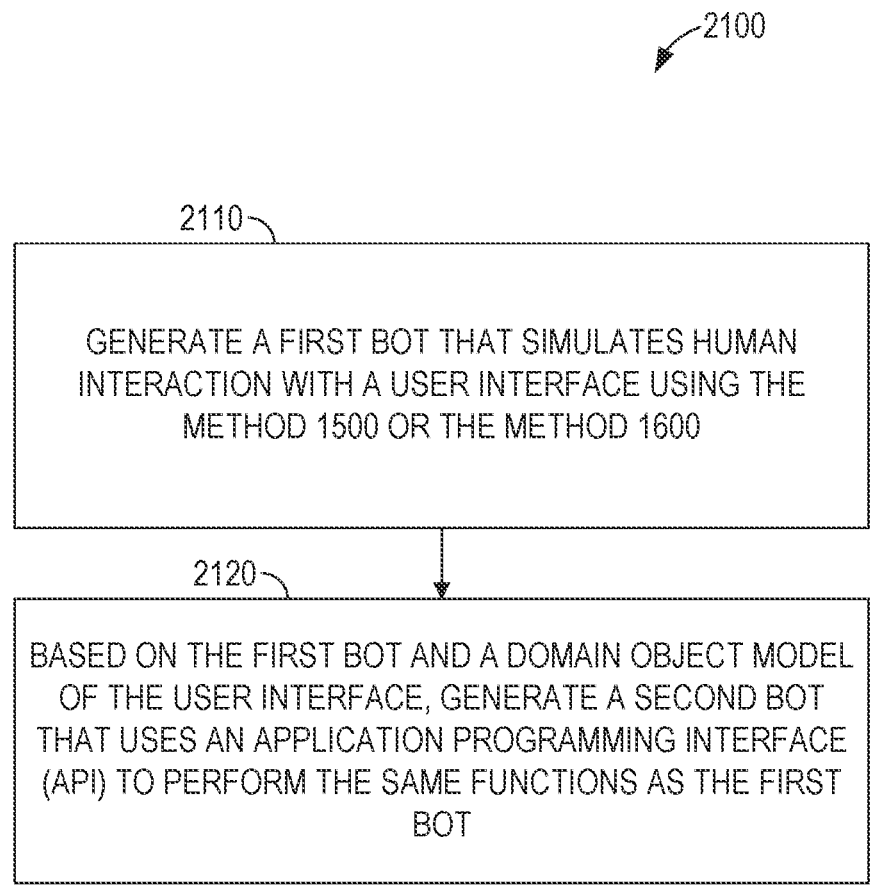
FIG. 21 is a flowchart illustrating operations of a method suitable for generating a bot based on observed behavior, according to some example embodiments.

FIG. 21 is a flowchart illustrating operations of a method 2100 suitable for generating a bot based on observed behavior, according to some example embodiments. The method 2100 includes operations 2110 and 2120. By way of example and not limitation, the method 2100 is described as being performed by the devices, modules, and databases of FIGS. 1-6.

In operation 2110, the bot generation server 135 generates a first bot that simulates human interaction with a UI using the method 1900 or the method 2000. The first hot can be run by the bot execution module 240 of a client device to automate a UI intended for human interaction, thus speeding up the task associated with the UI and reducing errors.

The bot generation module 450, in operation 2120, generates a second bot based on the first bot and a DOM of the UI, with the second bot using an application programming interface (API) to perform the same functions as the first bot. The DOM of the UI indicates variables and functions associated with UI elements. Thus, UI interaction operations can be converted to programmatic operations. As an example, the first bot selects a text field, types characters into the text field, and presses a button to submit the entered characters. The DOM indicates a variable that holds the value of the text field and a function that is invoked with a parameter list when the button is pressed. The second bot sets the variable and invokes the function with the parameter list. Thus, by comparison with the first bot, the second bot saves processing resources and time that would be spent in rendering the UI. Additionally, the time and resources involved in manipulating the UI to set variables and make function calls is saved.

As another example, a first API call to the server populates fields in the UI by retrieving data for a business object. One or more API calls are used by the UI to set updated values entered by the first hot. The changes performed by the first bot are observed by the bot generation module 450 in operation 2120 and, in the second bot, the one more API calls are replaced by a single API call that writes all values for the business object. Thus, the API bot starts by getting the current state of the business object and the submits an updated version of the business object (by making the observed changes) to the server.

EXAMPLES

Example 1. A method comprising:
receiving, from a set of client devices and via a network, a data set, each element of the data set comprising:
a process instance identifier for a process instance comprising a task;
a duration of time to perform the task by a user; and
a number of interactions by the user in performing the task;
based on the received process instance identifiers, durations of time, and numbers of interactions, identifying a task of a process instance for automation;
based on a subset of the data set that comprises data for the identified task, generating a bot to automatically perform the identified task, the generating of the bot comprising determining a default value for a parameter of the bot; and providing, to a client device of the set of client devices and via the network, the bot.

Example 2. The method of example 1, further comprising:
running the bot on the client device; and receiving, by the bot, interactive user input to modify the default value.

Example 3. The method of example 1 or example 2, further comprising:
running the hot on the client device; and
accessing, by the bot, data from a data file to modify the default value.

Example 4. The method of example 3, wherein the accessing of the data from the data file comprises processing a known field location in the data file using optical character recognition (OCR).

Example 5. The method of any of examples 1 to 4, wherein the generating of the bot comprises generating parameter validation code for the parameter based on the data set.

Example 6. The method of any of examples 1 to 5, wherein the generating of the bot comprises determining a relationship between two fields of a user interface.

Example 7. The method of any of examples 1 to 6, wherein the determining of the relationship between the two parameters comprises determining that the two parameters have the same value.

Example 8. The method of any of examples 1 to 7, wherein the generating of the bot comprises determining that a first parameter of the bot has a value equal to the sum of the values of a plurality of other parameters of the bot.

Example 9. The method of any of examples 1 to 8, wherein the first number of interactions comprises a number of mouse clicks.

Example 10. The method of any of examples 1 to 9, wherein the first number of interactions comprises a number of pastes of information.

Example 11. The method of any of examples 1 to 10, further comprising:
providing, to the client device, instructions that, when executed by one or more processors of the client device, cause the client device to perform operations comprising:
displaying a user interface for performing the identified task; and
automatically interacting with the user interface by executing the bot.

Example 12. A system comprising:
a memory that stores instructions; and
one or more processors configured by the instructions to perform operations comprising:
receiving, from a set of client devices and via a network, a data set, each element of the data set comprising:
a process instance identifier for a process instance comprising a task;
a duration of time to perform the task by a user; and
a number of interactions by the user in performing the task;
based on the received process instance identifiers, durations of time, and numbers of interactions, identifying a task of a process instance for automation;
based on a subset of the data set that comprises data for the identified task, generating a bot to automatically perform the identified task, the generating of the bot comprising determining a default value for a parameter of the bot; and providing, to a client device of the set of client devices and via the network, the bot.

Example 13. The system of example 12, wherein:
the system further comprises the client device; and
the client device is configured to perform operations comprising:
running the bot; and
receiving, by the bot, interactive user input to modify the default value.

Example 14. The system of example 12 or example 13, wherein:
the system further comprises the client device; and
the client device is configured to perform operations comprising:
running the bot; and
accessing, by the bot, data from a data file to modify the default value.

Example 15. The system of example 14, wherein the accessing of the data from the data file comprises processing a known field location in the data file using optical character recognition (OCR).

Example 16. The system of any of examples 12 to 15, wherein the generating of the bot comprises generating parameter validation code for the parameter based on the data set.

Example 17. The system of any of examples 12 to 16, wherein the generating of the bot comprises determining a relationship between two parameters of the bot.

Example 18. The system of any of examples 12 to 17, wherein the determining of the relationship between the two parameters comprises determining that the two parameters have the same value.

Example 19. The system of any of examples 12 to 18, wherein the generating of the bot comprises determining that a first parameter of the bot has a value equal to the sum of the values of a plurality of other parameters of the bot.

Example 20. A non-transitory computer-readable medium that stores instructions that, when executed by one or more processors, cause the one or more processors to perform operations comprising:
receiving, from a set of client devices and via a network, a data set, each element of the data set comprising:
a process instance identifier for a process instance comprising a task;
a duration of time to perform the task by a user; and
a number of interactions by the user in performing the task;
based on the received process instance identifiers, durations of time, and numbers of interactions, identifying a task of a process instance for automation;
based on a subset of the data set that comprises data for the identified task, generating a bot to automatically perform the identified task, the generating of the bot comprising determining a default value for a parameter of the bot; and
providing, to a client device of the set of client devices and via the network, the bot.

Figure 22:
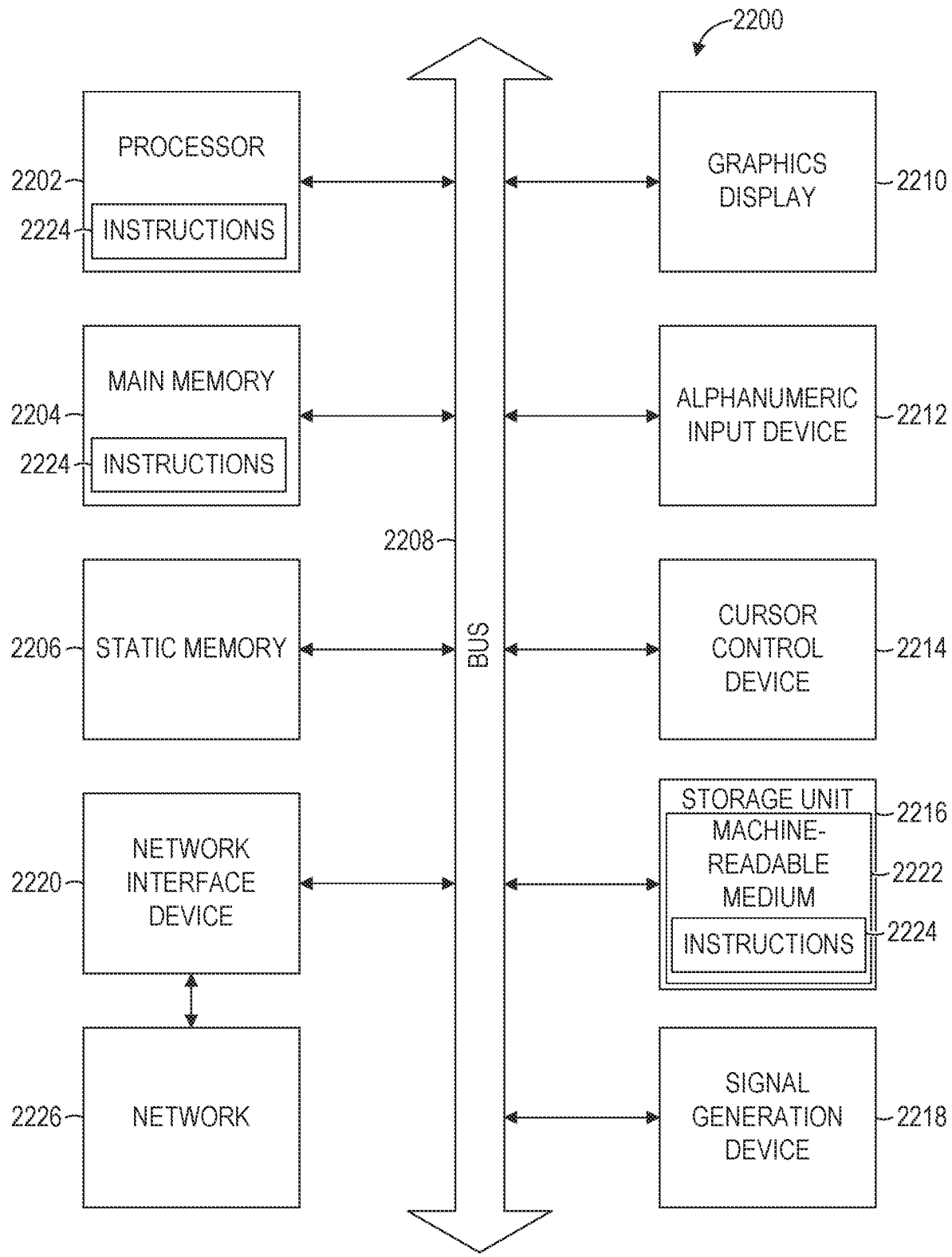
FIG. 22 is a block diagram illustrating components of a machine, according to some example embodiments.

FIG. 22 is a block diagram illustrating components of a machine 2200, according to some example embodiments, able to read instructions from a machine-readable medium (e.g., a machine-readable storage medium, a computer-readable storage medium, or any suitable combination thereof) and perform any one or more of the methodologies discussed herein, in whole or in part. Specifically, FIG. 22 shows a diagrammatic representation of the machine 2200 in the example form of a computer system within which instructions 2224 (e.g., software, a program, an application, an applet, an app, or other executable code) for causing the machine 2200 to perform any one or more of the methodologies discussed herein may be executed, in whole or in part. In alternative embodiments, the machine 2200 operates as a standalone device or may be connected (e.g., networked) to other machines. In a networked deployment, the machine 2200 may operate in the capacity of a server machine or a client machine in a server-client network environment, or as a peer machine in a distributed (e.g., peer-to-peer) network environment. The machine 2200 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 2224, sequentially or otherwise; that specify actions to be taken by that machine.

Further, while only a single machine is illustrated, the term "machine" shall also be taken to include a collection of machines that individually or jointly execute the instructions 2224 to perform all or part of any one or more of the methodologies discussed herein.

The machine 2200 includes a processor 2202 (e.g., a central processing unit (CPU), a graphics processing unit (GPU), a digital signal processor (DSP), an application-specific integrated circuit (ASIC), a radio-frequency integrated circuit (RFC), or any suitable combination thereof), a main memory 2204, and a static memory 2206, which are configured to communicate with each other via a bus 2208. The machine 2200 may further include a graphics display 2210 (e.g., a plasma display panel (PDP), a light-emitting diode (LED) display, a liquid crystal display (LCD), a projector, or a cathode ray tube (CRT)). The machine 2200 may also include an alphanumeric input device 2212 (e.g., a keyboard), a cursor control device 2214 (e.g., a mouse, a touchpad, a trackball, a joystick, a motion sensor, or another pointing instrument), a storage unit 2216, a signal generation device 2218 (e.g., a speaker), and a network interface device 2220.

The storage unit 2216 includes a machine-readable medium 2222 on which are stored the instructions 2224 embodying any one or more of the methodologies or functions described herein. The instructions 2224 may also reside, completely or at least partially, within the main memory 2204, within the processor 2202 (e.g., within the processor's cache memory), or both, during execution thereof by the machine 2200. Accordingly, the main memory 2204 and the processor 2202 may be considered as machine-readable media. The instructions 2224 may be transmitted or received over a network 2226 via the network interface device 2220.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 2222 is shown, in an example embodiment, to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions for execution by a machine (e.g., the machine 2200), such that the instructions, when executed by one or more processors of the machine (e.g, the processor 2202), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules, A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field-programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instant in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instant of time and to constitute a different hardware module at a different instant of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" and "an" are herein used, as is common in patent documents, to include one or more than one instance. Finally, as used herein, the conjunction "or" refers to a non-exclusive "or," unless specifically stated otherwise.

What is claimed is:

1. A method comprising:
    receiving, from a set of client devices and via a network, a data set, each element of the data set comprising:
        a process instance identifier and a business object type for a process instance comprising a plurality of tasks;
        a duration of time to perform each of the plurality of tasks by a user; and
        a clickstream identifying fields modified by the user;
    based on the received process instance identifiers, durations of time, and clickstreams, causing a user interface to be presented that comprises:
    an element corresponding to each task of at least a subset of the plurality of tasks, each element comprising a visual indicator that indicates a likelihood that the corresponding task would benefit from automation;
    receiving, via the user interface, a selection of selecting a task of the plurality of tasks for automation; and
    based on the selection of the task and a subset of the data set that comprises data for the selected task, generating a bot to automatically perform the selected task, the generating of the bot comprising:
        determining a default value for a parameter of the bot; and
        generating a parameter validation code for the parameter, the parameter validation code configured to detect invalid parameter values.

2. The method of claim 1, further comprising:
    running the bot; and
    receiving, by the bot, interactive user input to modify the default value.

3. The method of claim 1, further comprising:
    running the bot; and
    accessing, by the bot, data from a data file to modify the default value.

4. The method of claim 3, wherein the accessing of the data from the data file comprises processing a known field location in the data file using optical character recognition (OCR).

5. The method of claim 1, further comprising:
    accessing, by the bot, data indicating a modified value of the parameter; and
    validating the modified value of the parameter using the parameter validation code for the parameter.

6. The method of claim 1, further comprising:
    determining a probability that a first field of a user interface of the selected task has a value that is a sum of two other fields of the user interface of the selected task; and
    based on the probability and a threshold, configuring the bot to set the value of the first field to the sum of the two other fields.

7. The method of claim 1, wherein the clickstream comprises a number of mouse clicks.

8. The method of claim 1, wherein:
the selecting of the task for automation is further based on an average number of pastes of information in the clickstreams for the selected task.

9. The method of claim 1, further comprising:
providing, to a client device, instructions that, when executed by one or more processors of the client device, cause the client device to perform operations comprising:
displaying a user interface of the selected task; and
automatically interacting with the user interface of the selected task by executing the bot.

10. A system comprising:
a memory that stores instructions; and
one or more processors configured by the instructions to perform operations comprising:
receiving, from a set of client devices and via a network, a data set, each element of the data set comprising:
a process instance identifier and a business object type for a process instance comprising a plurality of tasks;
a duration of time to perform each of the plurality of tasks by a user; and
a clickstream identifying fields modified by the user;
based on the received process instance identifiers, durations of time, and clickstreams, causing a user interface to be presented that comprises:
an element corresponding to each task of at least a subset of the plurality of tasks, each element comprising a visual indicator that indicates a likelihood that the corresponding task would benefit from automation;
receiving, via the user interface, a selection of a task of the plurality of tasks for automation;
based on the selection of the task and a subset of the data set that comprises data for the selected task, generating a bot to automatically perform the selected task, the generating of the bot comprising:
determining a default value for a parameter of the bot; and
generating a parameter validation code for the parameter, the parameter validation code configured to detect invalid parameter values; and
providing, to a client device of the set of client devices and via the network, the bot.

11. The system of claim 10, wherein:
the system further comprises the client device; and
the client device is configured to perform operations comprising:
running the bot; and
receiving, by the bot, interactive user input to modify the default value.

12. The system of claim 10, wherein:
the system further comprises the client device; and
the client device is configured to perform operations comprising:
running the bot; and
accessing, by the bot, data from a data file to modify the default value.

13. The system of claim 12, wherein the accessing of the data from the data file comprises processing a known field location in the data file using optical character recognition (OCR).

14. The system of claim 10, wherein the operations further comprise:
accessing, by the bot, data indicating a modified value of the parameter; and
validating the modified value of the parameter using the parameter validation code.

15. The system of claim 10, wherein the generating of the bot comprises determining that two fields of a user interface of the selected task have the same value.

16. The system of claim 10, wherein the operations further comprise:
determining a probability that a first field of a user interface of the selected task has a value that is a sum of two other fields of the user interface of the selected task; and
based on the probability and a threshold, configuring the bot to set the value of the first field to the sum of the two other fields.

17. A non-transitory computer-readable medium that stores instructions that, when executed by one or more processors, cause the one or more processors to perform operations comprising:
receiving, from a set of client devices and via a network, a data set, each element of the data set comprising:
a process instance identifier and a business object type for a process instance comprising a plurality of tasks;
a duration of time to perform each of the plurality of tasks by a user; and
a clickstream identifying fields modified by the user;
based on the received process instance identifiers, durations of time, and clickstreams, causing a user interface to be presented that comprises:
an element corresponding to each task of at least a subset of the plurality of tasks, each element comprising a visual indicator that indicates a likelihood that the corresponding task would benefit from automation;
receiving, via the user interface, a selection of selecting a task of the plurality of tasks for automation;
based on the selection of the task and a subset of the data set that comprises data for the selected task, generating a bot to automatically perform the selected task, the generating of the bot comprising:
determining a default value for a parameter of the bot; and
generating a parameter validation code for the parameter, the parameter validation code configured to detect invalid parameter value; and
providing, to a client device of the set of client devices and via the network, the bot.

18. The method of claim 1, wherein the generated parameter validation code for the parameter includes one or more of: a list of acceptable values for the parameter, a range of acceptable values for the parameter, a list of unacceptable values for the parameter, and a range of unacceptable values for the parameter.

19. The non-transitory computer-readable medium of claim 17,
wherein the generated parameter validation code for the parameter includes one or more of: a list of acceptable values for the parameter, a range of acceptable values for the parameter, a list of unacceptable values for the parameter, and a range of unacceptable values for the parameter.

20. The system of claim 10, wherein the business object type is selected from the group consisting of:
person, place, thing, document, service, employee, customer, company, sales order, invoice, and product.

* * * * *